US012722777B2

(12) United States Patent
Moore et al.

(10) Patent No.: US 12,722,777 B2
(45) Date of Patent: Sep. 1, 2026

(54) EXHAUST AREA AND FLOW TURNING CONTROL

(71) Applicant: Whisper Aero Inc., Crossville, TN (US)

(72) Inventors: Mark Douglass Moore, Crossville, TN (US); Ian Andreas Villa, Nashville, TN (US); Devon Jedamski, Nashville, TN (US); Andrew Stephen Hahn, Yorktown, VA (US); Aaron Timothy Perry, Franklin, TN (US); Jonathan Jeffrey Paravano, Brentwood, TN (US); Xiaofan Fei, Bellevue, WA (US); Paul Rothhaar, Yorktown, VA (US)

(73) Assignee: Whisper Aero Inc., Crossville, TN (US)

( * ) Notice: Subject to any disclaimer, the term of this patent is extended or adjusted under 35 U.S.C. 154(b) by 0 days.

(21) Appl. No.: 18/814,250

(22) Filed: Aug. 23, 2024

(65) Prior Publication Data

US 2025/0066015 A1 Feb. 27, 2025

Related U.S. Application Data

(60) Provisional application No. 63/643,378, filed on May 6, 2024, provisional application No. 63/534,467, filed on Aug. 24, 2023.

(51) Int. Cl.

| | |
|---|---|
| ***B64C 21/01*** | (2023.01) |
| ***F02K 1/12*** | (2006.01) |
| ***F02K 1/15*** | (2006.01) |

(52) U.S. Cl.

CPC ................ *B64C 21/01* (2023.01); *F02K 1/12* (2013.01); *F02K 1/15* (2013.01)

(58) Field of Classification Search

CPC .............. B64C 21/01; F02K 1/15; F02K 1/12

See application file for complete search history.

(56) References Cited

U.S. PATENT DOCUMENTS 2,828,603 A 4/1958 Laucher
3,807,639 A 4/1974 Soligny et al.
3,835,643 A * 9/1974 De Garcia, Jr. ........ F02K 1/002 60/39.43

(Continued)

FOREIGN PATENT DOCUMENTS

CN 104943851 A 9/2015
CN 206344647 U 7/2017

(Continued)

OTHER PUBLICATIONS

PCT International Search Report and Written Opinion, PCT Application No. PCT/IB2023/056047, Sep. 8, 2023, 10 paqes.

(Continued)

*Primary Examiner* — Tye William Abell
(74) *Attorney, Agent, or Firm* — Banner & Witcoff, Ltd.

(57) ABSTRACT

An aircraft may comprise ducted fans. The ducted fans may be an array of ducted fans. An array of ducted fans may be integrated in a wing of the aircraft. A ducted fan may be integrated in a horizontal tail of the aircraft. The wing may include a movable edge, such as a flap, to provide both exhaust area and flow turning control. The movable edge may be articulated by pivoting the movable edge. The movable edge may be extended and retracted.

31 Claims, 24 Drawing Sheets

(56) References Cited

U.S. PATENT DOCUMENTS

| | | | | |
|---|---|---|---|---|
| 4,301,980 | A | 11/1981 | Bradfield et al. | |
| 4,505,443 | A | 3/1985 | Bradfield et al. | |
| 4,813,607 | A | 3/1989 | Hill et al. | |
| 5,038,559 | A | 8/1991 | Blackmore | |
| 5,115,996 | A * | 5/1992 | Moller | B64C 29/0025 D12/326 |
| 5,165,227 | A | 11/1992 | Grieb | |
| 10,724,472 | B1 | 7/2020 | Chase | |
| 10,787,254 | B1 * | 9/2020 | Chen | B64D 27/34 |
| 11,597,509 | B1 * | 3/2023 | Alfaro | B64C 29/0025 |
| 11,802,485 | B2 | 10/2023 | Moore et al. | |
| 12,000,309 | B2 | 6/2024 | Moore et al. | |
| 12,006,891 | B2 | 6/2024 | Moore et al. | |
| 12,420,936 | B2 * | 9/2025 | Gusman | B64C 3/32 |
| 2004/0026563 | A1 * | 2/2004 | Moller | B64D 31/06 244/12.4 |
| 2007/0086889 | A1 | 4/2007 | Matheny | |
| 2008/0016872 | A1 | 1/2008 | Toffan et al. | |
| 2008/0245925 | A1 * | 10/2008 | Udall | B64C 5/02 244/55 |
| 2009/0317246 | A1 | 12/2009 | Lutz et al. | |
| 2010/0111685 | A1 | 5/2010 | Sjunnesson et al. | |
| 2013/0062455 | A1 * | 3/2013 | Lugg | B64C 39/12 244/12.3 |
| 2014/0271207 | A1 | 9/2014 | Drane | |
| 2014/0321968 | A1 | 10/2014 | Kreitmair-Steck | |
| 2015/0226155 | A1 | 8/2015 | Klingels et al. | |
| 2016/0363050 | A1 | 12/2016 | Joshi et al. | |
| 2017/0009656 | A1 | 1/2017 | Vessot et al. | |
| 2017/0203839 | A1 * | 7/2017 | Giannini | B64U 50/33 |
| 2019/0100303 | A1 | 4/2019 | Campbell | |
| 2019/0195169 | A1 | 6/2019 | Montes et al. | |
| 2019/0217937 | A1 * | 7/2019 | Wiegand | B64D 27/12 |
| 2020/0047896 | A1 | 2/2020 | Dierksmeier | |
| 2020/0331589 | A1 * | 10/2020 | Cummings | B64D 27/32 |
| 2021/0107664 | A1 | 4/2021 | Rabbi et al. | |
| 2022/0073199 | A1 * | 3/2022 | Vondrell | B64D 31/18 |
| 2022/0266979 | A1 * | 8/2022 | Bansal | B64C 11/001 |
| 2022/0281594 | A1 * | 9/2022 | Ochoa De Eribe Martínez | B64D 27/31 |
| 2023/0086655 | A1 | 3/2023 | Wang | |
| 2023/0219686 | A1 * | 7/2023 | Zelayeta | B64D 27/34 244/6 |
| 2024/0002034 | A1 | 1/2024 | Moore et al. | |
| 2024/0375780 | A1 * | 11/2024 | Gusman | B64C 3/32 |

FOREIGN PATENT DOCUMENTS

| | | | |
|---|---|---|---|
| CN | 111237084 | A | 6/2020 |
| CN | 113291459 | A | 8/2021 |
| FR | 3087824 | A1 | 5/2020 |
| JP | 2016075248 | A | 5/2016 |
| WO | 2015128563 | A1 | 9/2015 |
| WO | 2020084221 | A1 | 4/2020 |
| WO | 2020227837 | A1 | 11/2020 |
| WO | 2024010834 | A1 | 1/2024 |

OTHER PUBLICATIONS

PCT International Search Report and Written Opinion, PCT Application No. PCT/IB2022/051659, May 26, 2022, 9 pages.

PCT International Search Report and Written Opinion, PCT Application No. PCT/IB2022/051656, May 26, 2022, 9 pages.

PCT International Search Report and Written Opinion, PCT Application No. PCT/IB2022/051653, May 26, 2022, 9 pages.

United States Office Action, U.S. Appl. No. 17/679,502, Oct. 3, 2022, 18 pages.

Glahn, V. and Uwe, H. "Use of the Coanda Effect for Jet Deflection and Vertical Lift with Multiple-flat-plate and Curved-plate Deflection Surfaces" NACA TN 4377, Sep. 1, 1958.

"Powered-Lift Aerodynamics and Acoustics" NASA SP-406, Langley Research Center Conference May 24-26, 1976.

Agard, "The Aerodynamics of V/STOL Aircraft" NATO, May 1968.

Langley Research Center, "NASA Conference on V/STOL Aircraft—a Compilation of the Papers Presented" NASA, Nov. 1960.

Phelps, A.E. and Johnson, J. L. and Margason, R. J., "Summary of Low-Speed Aerodynamic Characteristics of Upper-Surface-Blown Jet-Flap Configurations" N78-24050.

Sep. 9, 2025—(WO) International Search Report and Written Opinion—App PCTUS2025031447.

"This Over-Wing Engine Setup Helped Boeing's YC-14 Master Short Runways" [https://www.jalopnik.com/1964717/boeing-yc-14-over-wing-engine-design/] Last accessed Sep. 22, 2022.

"Pioneering concepts for Personal Air Transport Systems." Onera. Retrieved from [http://www.nianet.org/ODM/ODM%20Wednesday%20presentations%20Final/13%20LeTallec%20ONERA.pdf] on Oct. 23, 2024.

Lilium Jet air taxis close to take off | CNN, https://www.cnn.com/travel/article/lilium-electric-vtol-jet/index.html, retrieved May 29, 2025, 8 pages.

Lilium Jet—Wikipedia, https://en.wikipedia.org/wiki/Lilium_Jet, retrieved May 29, 2025, 4 pages.

Five seater self-flying air taxi unveiled, https://www.bbc.com/news/business-48297440, retrieved May 29, 2025, 4 pages.

ECO-150 | ESAero—Empirical Systems Aerospace, https://www.esaero.com/core-technology-innovations/eco-150, retrieved May 29, 2025, 3 pages.

Blown flap—Wikipedia, https://en.wikipedia.org/wiki/Blown_flap, retrieved May 29, 2025, 6 pages.

Aug. 14, 2025—(WO) International Search Report and Written Opinion—App PCT/US2025/031744.

* cited by examiner 100
115
101
113

100
111
107
105
103A
113
103B
107
105
111

100
101
113
115

100
103B
111
105
113
103A
105
111

100
103A
107
105
111
103B
107
105
111

100
103B
201B
105
210
111
201A
103A
210
105
111

100
210B
210B 100
210B
210B 100
210B
210B 100
210B
210B 103
230C
230B
230A
201C
109C 103
230C
230B
230A
201C
201B
201A
250C
250B
250A
109C
109B
109A 600
601
603
603A
605
607
609
611
611A
613

EXHAUST AREA AND FLOW TURNING CONTROL

CROSS-REFERENCE TO RELATED APPLICATIONS

This application claims the benefit of U.S. Provisional Patent Application No. 63/643,378, filed on May 6, 2024 and titled "AIRCRAFT AND VARIABLE AREA EXHAUST TRAILING EDGE"; and U.S. Provisional Patent Application No. 63/534,467, filed on Aug. 24, 2023 and titled "JET WING DELIVERY DRONE"; each of which is incorporated herein by reference in its entirety for any and all non-limiting purposes.

BACKGROUND

Field of Technology

The present disclosure generally relates to aircraft that include one or more propulsor fans. The disclosure more particularly relates to thrust vector control of aircraft.

Description of the Related Art

Conventional takeoff and landing jets may utilize propulsor fans with open rotors and propellers. These types of conventional propulsor fans have reached their acoustic limits. Conventional propulsors include multiple blades that are supported on a single end thereby limiting the blade count (e.g., to twelve or less blades). For conventional propulsors to emit sound that is at a frequency that is less perceivable to the human ear, the speed of the fans must be increased. However, conventional propulsors cannot be driven at a higher speed due to the single end structure. Furthermore, since conventional propulsor fans are supported only at a single end, the angle of the fan blades may change as the blade fan spins at faster speeds which results in changes in pitch that is audible to the human ear. As a result, conventional takeoff and landing jets increase noise pollution. Additionally, in order to produce thrust efficiently in hover and forward flight modes, some conventional aircraft must mechanically change the pitch of the rotor blades. Conventional systems for achieving the mechanical change of the pitch are complex and may similarly result in an increase in noise pollution.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome the challenges described above, and to overcome other challenges that will be apparent upon reading and understanding the present specification, aspects described herein are directed towards systems and methods for exhaust area and/or flow turning control. Aspects of this disclosure relate to an integration of a propulsion system into an airfoil of a vehicle or craft, wherein the integration is configurable to allow thrust vector control and/or flow turning of the vehicle. Such integrations or systems may generally be referred herein as a jetfoil. In certain embodiments, a jetfoil system may comprise one or more arrays of ducted fans, or the like, integrated into an airfoil such as a wing, tail, and/or other component of an aircraft. Each array may have at least 3 or more propulsors, which may be ducted fan arrays, including those described herein. The aircraft may be configured to carry passengers, cargo, or a combination. The aircraft may be a passenger aircraft or a drone aircraft. Each jetfoil may include one or more propulsors, or an array of 3 or more propulsors, as well as, in some embodiments, one or more flaps to control the takeoff and landing mode of the aircraft and to control the area of the inlet and outlet of the propulsors (e.g., the exhaust area). The one or more jetfoils may use the one or more propulsors (or an array of 3 or more propulsors) to blow air at high speeds over a wing of the aircraft while moving (e.g., articulating) one or more components (e.g., flaps) of the jetfoil to achieve a quiet, safe, and scalable means of controlling the aircraft.

The one or more jetfoils may be integrated into an airfoil (e.g., a wing, a tail, and/or other components of the aircraft configured to enable control of the flight of the aircraft). The one or more jetfoils may be integrated as an array of ducted fans. In some examples, the array of ducted fans together form a ducted wing. Operation of the aircraft, including takeoff, landing, forward flight, and/or hovering modes, is achieved by controlling the exhaust area and flow turning of the one or more jetfoils. In some examples, control of the exhaust area and flow turning of the one or more jetfoils is achieved by articulation of the one or more flaps. Also or alternatively, in some examples, control of the exhaust area and flow turning of the one or more jetfoils is achieved by a single articulation of an element of the jetfoil. For example, a single articulatable trailing edge (e.g., a flap) of the jetfoil may be articulated to modify both the exhaust area of the propulsors and the flow turning caused by the configuration of the articulatable trailing edge. The articulatable trailing edge may be a portion of an articulatable trailing edge of the jetfoil. In some examples, the single articulation may be achieved by pivoting the articulatable trailing edge of the jetfoil. In some examples, the single articulation may be achieved by retracting or extending the articulatable trialing edge of the jetfoil. The use of a single articulation to control the exhaust area and the flow turning may, by combining the exhaust area change with the articulation of elements of the jetfoil required to turn the flow, eliminate inefficiencies and reduce complexities as compared to conventional systems that require mechanically changing the pitch of the rotor blades to produce thrust in hover and forward flight.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

FIGS. 1A, 1B, 1C, 1D, 1E, 1F, and 1G illustrate different views of an aircraft 100 with ducted wings. As used herein, the general term aircraft is used to include manned and unmanned craft or vehicles. Some vehicles may be fully controlled by one or more individuals within the vehicle, such as a traditional pilot and/or driver. Others may have at least one aspect controlled or be maneuverable by at least one instruction or operation originating from outside of the vehicle. An instruction may be transmitted via one or more networks, such as network 1704 of FIG. 17, from one or more remote operators. Certain vehicles or craft recited herein may be at least partially controllable or operable via inputs derived from human controllers, non-human inputs, and combinations thereof. In this regard, aircraft 100 and/or any craft herein may be outfitted with one or more sensors (either physically located on or in the craft, or remote with respect to the craft) that may be used by one or more human or non-human operators to control, maneuver, and/or alter one aspect of the craft's operation. Those skilled in the art will appreciate that an auto-pilot or other feature may be selectively activated. For example, an aircraft 100 (or any craft or vehicle disclosed herein) may be an aircraft as described in U.S. patent application Ser. No. 18/208,181, filed on Jun. 9, 2023 and titled "DUCTED WING WITH FLAPS", which claims the benefit of U.S. Provisional Patent Application No. 63/356,891, filed on Jun. 29, 2022 and titled "CTOL JET, each of which is hereby incorporated by reference in its entirety. The aircraft 100 may be a passenger aircraft or a drone aircraft in various embodiments. Depending on the orientation of one or more flaps of the ducted wings, the aircraft 100 may operate in one of a plurality of different takeoff and landing modes such as conventional takeoff and landing (CTOL), a vertical takeoff and landing (VTOL) mode, and a short takeoff and landing (STOL) mode as described herein.

Figure 1A:
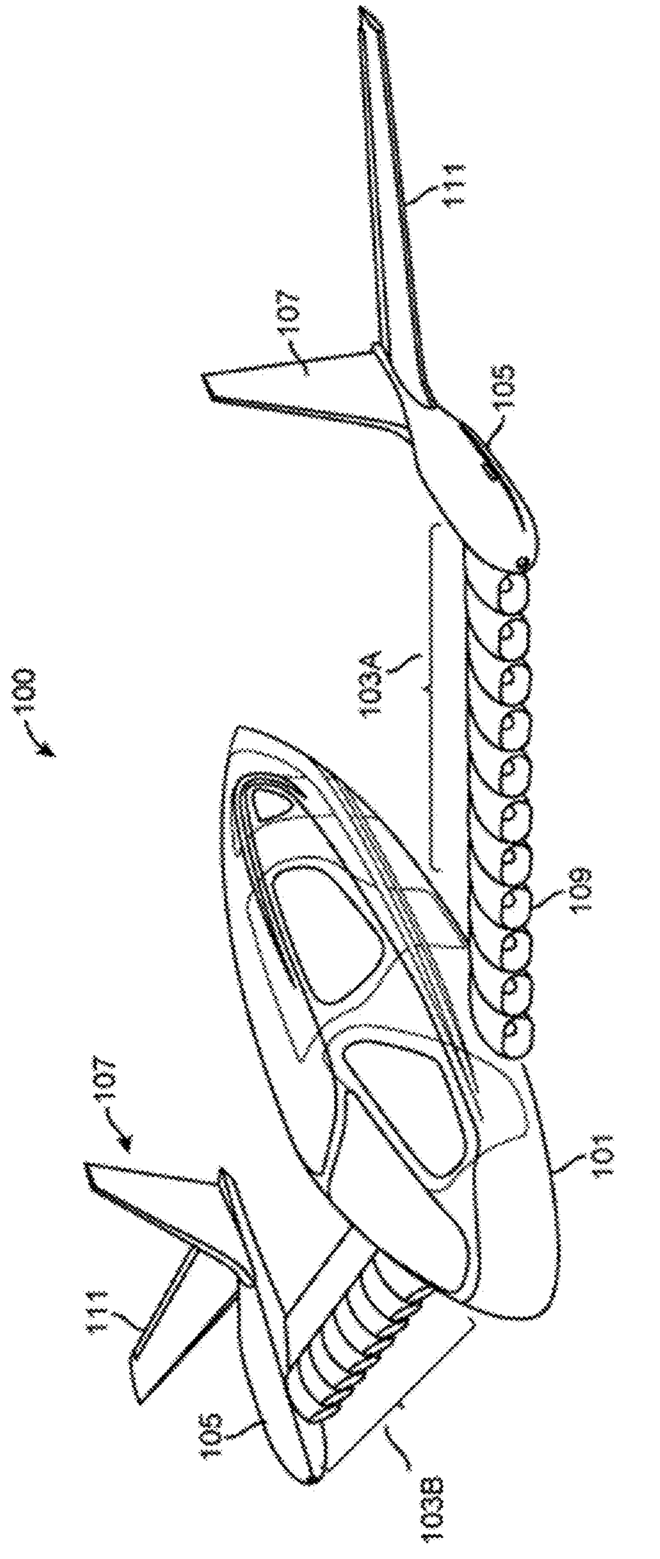
FIG. 1A illustrates a top-front-left perspective view of an example aircraft with a ducted wing according to one or more example arrangements.
Figures 1B, 1C, 1D:
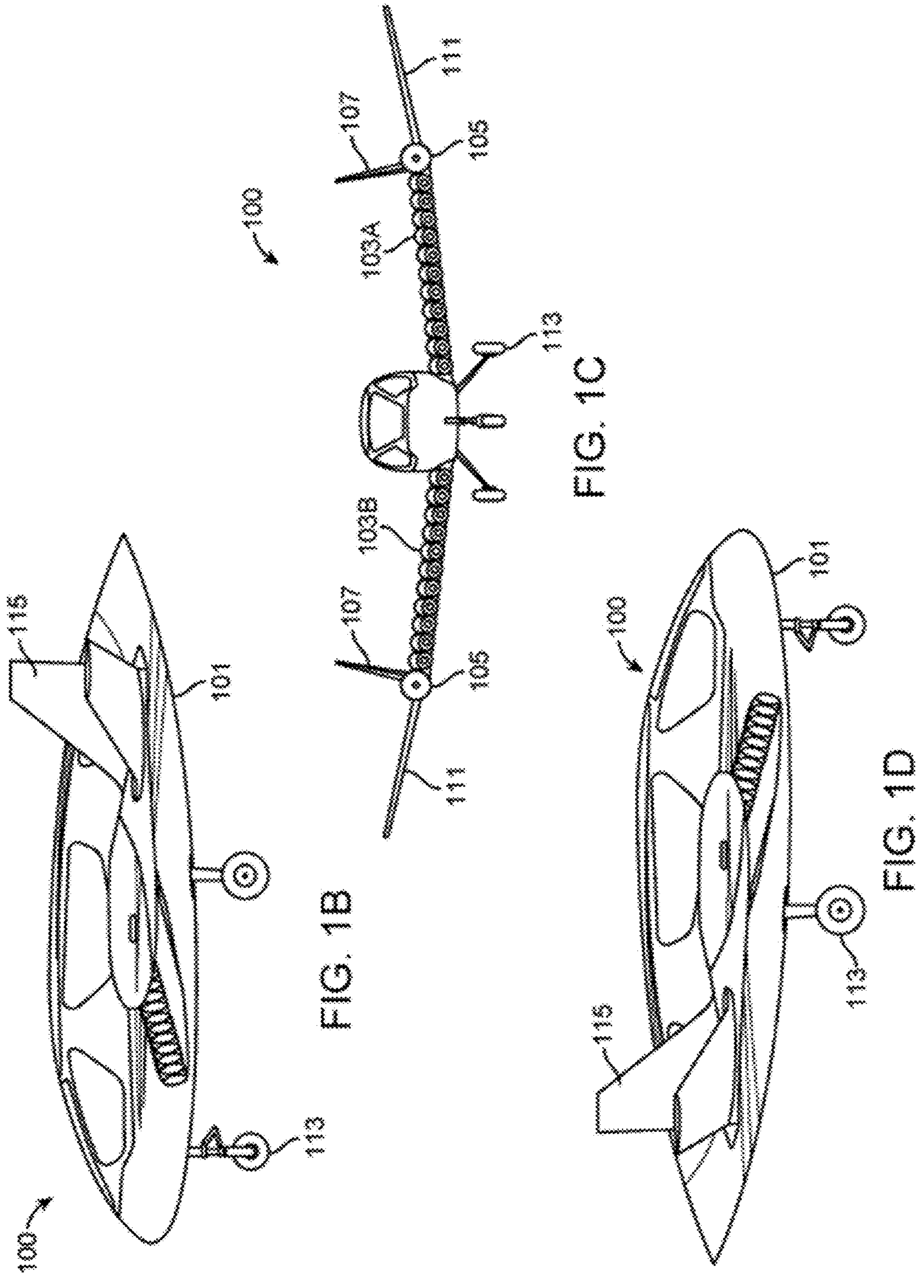
FIGS. 1B, 1C, 1D, 1E, 1F, and 1G respectively illustrate a right-side view of an example aircraft with a ducted wing, a front view of an example aircraft with a ducted wing, a left-side view of an example aircraft with a ducted wing, a rear view of an example aircraft with a ducted wing, a bottom view of an example aircraft with a ducted wing, and a top view of an example aircraft with a ducted wing each according to one or more example arrangements.
Figures 1E, 1F, 1G:
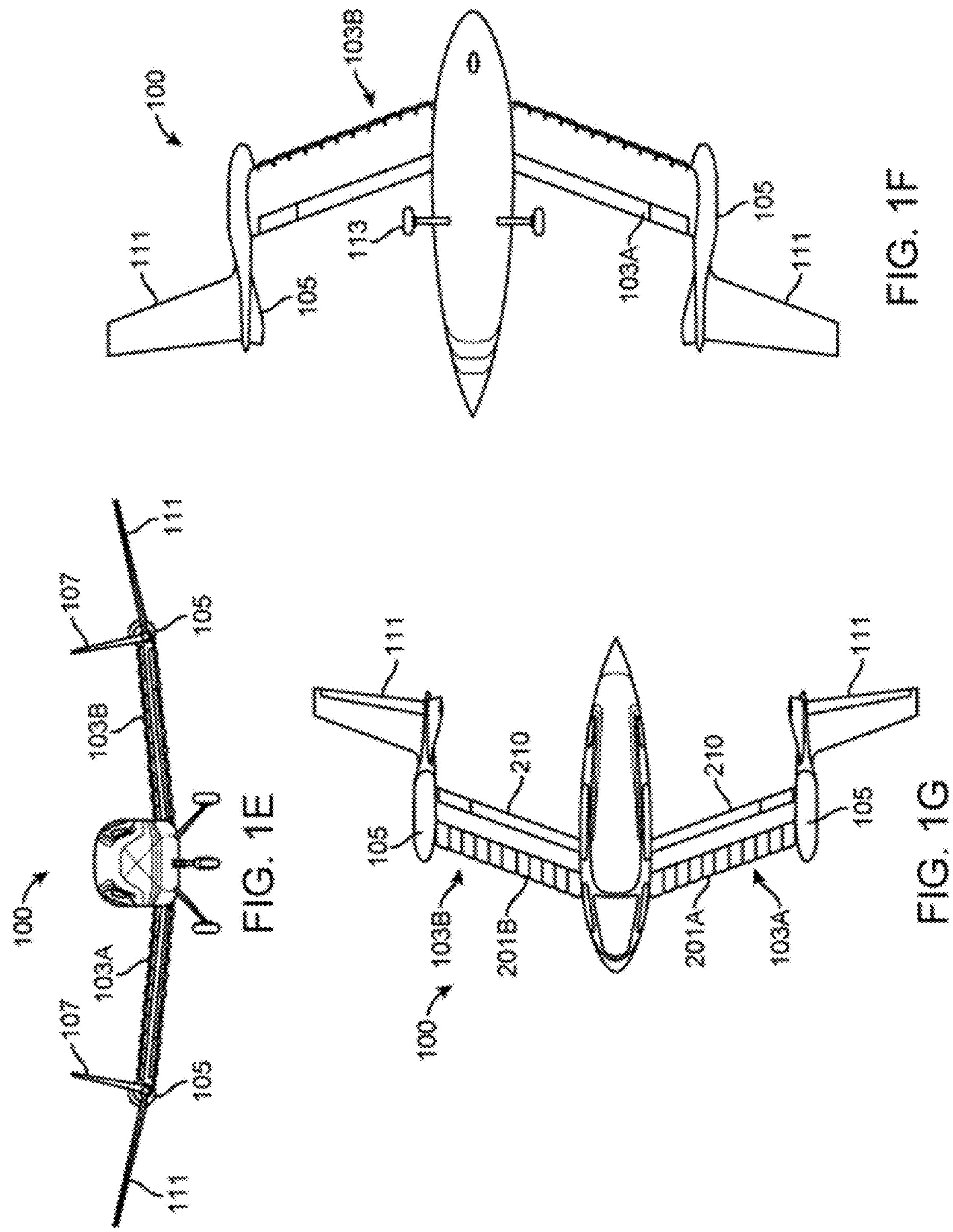

Specifically, FIG. 1A illustrates a top-front-left perspective view of the aircraft 100, FIG. 1B illustrates a right-side view of the aircraft 100 with the ducted wing, FIG. 1C illustrates a front view of the aircraft 100 with the ducted wing, FIG. 1D illustrates a left-side view of the aircraft 100 with the ducted wing, FIG. 1E illustrates a rear view of the aircraft 100 with the ducted wing, FIG. 1F illustrates a bottom view of the aircraft 100 with the ducted wing, and FIG. 1G illustrates a top view of the aircraft 100 with the ducted wing. In some examples, the use of flaps included in a ducted wing allows for the aircraft 100 to transition between CTOL, STOL, and VTOL modes depending on the required application.

In some examples, the aircraft 100 may be a regional aircraft capable of carrying passengers and cargo. For example, the aircraft 100 may be configured to carry a plurality of passengers such as 5 to 30 plus passengers depending on the configuration of the aircraft 100. In some examples, the aircraft 100 may be a remotely controlled drone aircraft. The aircraft 100 may be configured to carry a payload (e.g., a package, or the like). In some examples, the aircraft 100 may be all-electric with a first range, such as a visual flight rules (VFR) range (e.g., less than 200 miles and/or other ranges). In some examples, the aircraft 100 may be hybrid-electric (e.g., using a range extender) to achieve a second range (e.g., up to 500 miles according to instrument flight rules (IFR), and/or other ranges). In some examples, the aircraft 100 may be non-electric to achieve distances greater than 500 miles, and/or other ranges.

An all-electric aircraft 100 may include a battery pack. For example, the aircraft 100 may include a battery pack with a 384-kWh capacity, 255 Whr/kg @ pack level that is liquid cooled, propagation resistant, and quad redundant. The battery pack may include battery cells. For example, the battery pack may include battery cells with a Farasis cylindrical production, 305 Watt-hour per kilogram (Whr/kg) at cell level, 2 C discharge/recharge, and 2000 cycle life. A hybrid electric aircraft 100 may use a range extender such as a Rolls-Royce 250 kilowatt (kW) turbogenerator.

The aircraft 100 (e.g., an aircraft) may comprise a fuselage 101, a plurality of ducted wings 103, an array of jetfoils 109, a plurality of booms 105, a plurality of horizontal tails 111 (e.g., wings), a plurality of vertical tails 107 (e.g., wings), and one or more landing mechanisms 113. The horizontal tails 111 and vertical tails 107 collectively form empennages of the aircraft 100. Note that in other embodiments, the aircraft 100 may include additional and/or alternative components to those shown in FIGS. 1A to 1E.

The fuselage 101 is a main body of the aircraft 100. The fuselage 101 may be a hollow structure. The fuselage 101 may be one continuous structure or may be a modular structure comprising multiple components that collectively form the fuselage 101. In some examples, the fuselage 101 contains one or more payloads. In some examples, the aircraft 100 is all-electric. In some examples, the aircraft 100 may utilize a hybrid electric system to enable longer endurance, more payload, and/or longer range as described herein.

In some examples, the fuselage 101 may comprise electrical components for control of the aircraft 100. Examples of electrical components for controlling the aircraft 100 include one or more controllers such as one or more processors and memory device(s) which are used to control the array of jetfoils 109 and the electrical components may be used to actuate one or more control surfaces of the aircraft 100 (e.g., control of ailerons, rudder, elevator, tabs, flaps, spoilers, slats, etc.).

Figure 2:
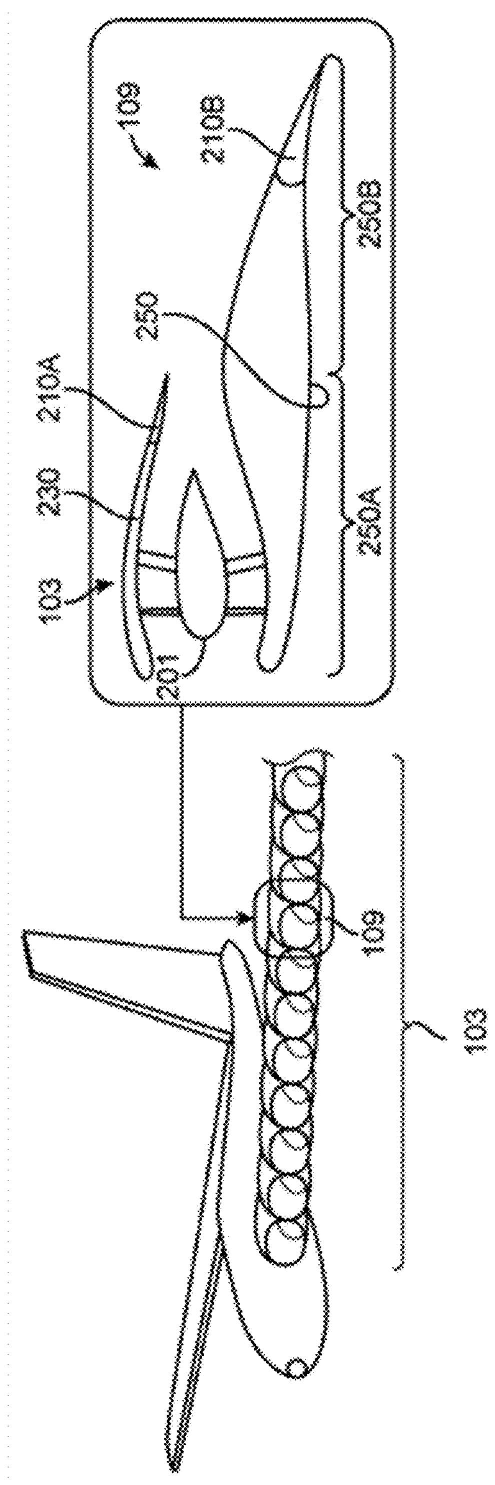
FIG. 2 illustrates a cross-sectional view of an example jetfoil according to one or more example arrangements.

The array of jetfoils 109 that is integrated into the ducted wings 103 may include a plurality of propulsors 201 (e.g., as shown in FIG. 2). In some examples, each jetfoil comprises a portion of the ducted wing 103 and a corresponding propulsor 201 within a duct of the jetfoil 109. Each jetfoil 109 may be configured to connect to at least one other jetfoil 109. For example, a plurality of jetfoils 109 may be connected to collectively form the ducted wings 103. An example propulsor 201 is described at U.S. Provisional Patent application No. 63/356,891 filed on Jun. 29, 2022, which is incorporated by reference in its entirety.

In some examples, the propulsors 201 are integrated into the leading edge of the ducted wings 103 rather than the trailing edge of the ducted wings 103. Integrating the array of propulsors 201 into the leading edge of the ducted wings 103 rather than the trailing edges of the ducted wings may provide a number of advantages. For example, the propulsors 201 integrated into the leading edge of the ducted wings 103 have less boundary layer ingestion compared to propulsors located at the trailing edge of the wing. The ducted wings 103 shield people located on the ground from jet noise generated by the propulsors 201 since the trailing edge of the ducted wing 103 functions as a noise shield. Thus, the aircraft 100 reduces noise pollution due to the ducted wing 103. Furthermore, the ducted wing 103 has high lift augmentation from the Coanda effect, less total wetted area than a wing with separate podded propulsors, and reduced inflow distortion at higher angles of attack due to the inlet of the ducted wing 103.

The number of propulsors 201 that are included in the ducted wings 103 is dependent on the application of the aircraft 100. For example, 32 propulsors may be used in the ducted wings 103, but any number of propulsors may be used in other embodiments. The plurality of propulsors 201 may generate 835 kW continuous/1128 kW continuous power with a maximum static thrust of 4465 lb., for example.

One or more landing mechanisms 113 may be attached to a bottom surface of the fuselage 101. The landing mechanisms 113 may be a landing gear (e.g., a tricycle gear), a landing skid, and/or other types of landing gear.

The ducted wing 103 is the main inboard wing of the aircraft 100. The ducted wing 103 is the central element connecting together the fuselage 101, the booms 105, the horizontal tails 111, and the vertical tails 107. The ducted wing 103 is located between a first end (e.g., a front) and a second end (e.g., a back) of the fuselage 101. The ducted wing 103 is configured to provide lift for the aircraft 100 for flight and has a dihedral with respect to the fuselage 101 to provide for stability in some examples. However, in other examples the ducted wing 103 may have an anhedral with respect to the fuselage 101. The ducted wing 103 may be made of a composite material such as carbon fiber, metal (e.g., aluminum or titanium), or an alloy.

In some examples, the ducted wing 103 includes a first side 103A disposed at a first side of the fuselage 101 (e.g., the right side) and a second side 103B that is disposed at a second side of the fuselage 101 (e.g., the left side). The first side 103A of the ducted wing 103 includes a first plurality of integrated propulsors 201A that are sequentially disposed across the length of the first side 103A of the ducted wing 103. Similarly, the second side 103B of the ducted wing 103 includes a second plurality of integrated propulsors 201B that are sequentially disposed across the length of the second side 103B of the ducted wing 103. The different sets of propulsors 201 integrated in each of the first side 103A and the second side 103B of the ducted wing 103 can be individually controlled. For example, the first plurality of integrated propulsors 201A can be controlled separately from the second plurality of integrated propulsors 201B.

In some examples, the first side 103A and the second side 103B of the ducted wing 103 are connected to the bottom surface of the fuselage 101 as shown in FIGS. 1A to 1G. In some examples, the first side 103A and the second side 103B of the ducted wing 103 may be connected to the upper surface of the fuselage 101 which allows for improved ground clearance, passenger ingress/egress, cargo loading/unloading, and package delivery. As described herein, the ducted wing 103 includes one or more control surfaces such as flaps and ailerons to control the aircraft 100 during flight as well as during takeoff and landing.

The first side 103A and the second side 103B of the ducted wing may be configured as one continuous structure that is connected to the bottom surface or upper surface of the fuselage 101. Alternatively, the first side 103A and the second side 103B of the ducted wing 103 may be separate structures, each coupled to the bottom surface or the upper surface of the fuselage 101.

In some examples, the aircraft 100 includes booms 105 that are connected to tips of the ducted wing 103. The main body of each boom 105 extends rearward with respect to the front of the fuselage 101 such that an end of each boom is located before the end of the fuselage 101 as shown in the side views of the aircraft in FIGS. 1B and 1D. The tip of the nose of the boom 105 comprises a toroidal volume that can be utilized for forward facing camera and sensor systems. Aft of this toroidal volume is space to place primary battery systems. Placing batteries aft of the toroidal volume allows span loading weight tuned to the structural, aero-elastic, and natural harmonic characteristics of the ducted wing 103. Volume in the booms 105 can be utilized for additional sensors (e.g., optical, aural, visual, olfactory, and/or other sensors) as well as navigation lights. The booms 105 also may include an intake for cooling of battery and sensor components.

In some examples, the aircraft 100 includes the horizontal tails 111 that are attached to the ends of the booms 105. As shown in FIGS. 1A to 1D, the horizontal tails 111 are arranged in an outboard horizontal tail arrangement. That is, each horizontal tail 111 extends in a horizontal direction away from a side surface of the boom 105 that is connected to the horizontal tail 111. The outboard horizontal tail arrangement of the horizontal tails 111 reduces the wetted area for drag and mass reduction as compared to a conventional fuselage mounted horizontal stabilizer. Moving the tails 111 outboard also moves the tails away from the downwash of the array of propulsors 201 that complicates control at low-speed and takeoff.

The horizontal tails 111 affixed at the end of the booms 105 feature elevator surfaces to provide longitudinal stability at all phases of flight. By placing the horizontal tails 111 outboard, the horizontal tails 111 are not in the downwash of the propulsors 201 that complicates control at low-speed and takeoff, necessitating larger variations to trim. Thus, the length of the booms 105 are determined according to air flow modeling that indicates the location of the downwash of the jetfoil 109. The length of the booms 105 are also determined according to the air flow modeling such that the horizontal tails 111 are positioned in an upwash field of the vortex roll-up off of the ducted wing 103 around the boom 105. The effectiveness of the horizontal tails 111 is thus increased as the vortex roll-up provides additional lift. At cruise conditions, the horizontal tails have a net lift vector pointed towards the forward flight direction, with a positive thrust component thereby reducing battery consumption. In some examples, the horizontal tails 111 include a dihedral of approximately 5 degrees to help with horizontal tip strike during landing of the aircraft 100. The horizontal tails 111 may have flaps that can be actuated with electromechanical actuators, for example.

The vertical tails 107 (e.g., vertical stabilizers) are located at the aft end of the booms 105 on the upper surface of the booms 105 to reduce boom and tail strike concerns. In some examples, a single vertical tail is attached to an upper surface of a corresponding boom 105 and extends in an upward direction towards the sky from the upper surface of the boom 105 so that the vertical tail 107 is above the boom 105. Each vertical tail 107 may have a movable control surface such as rudder that enables yaw control. The movable control surfaces of the vertical tails 107 pivot about an end that is connected to the portion of the vertical tail 107 to keep the aircraft 100 in line with the direction of motion of the aircraft 100. To change the direction of motion (e.g., yaw control) of the aircraft 100, the movable control surface may move (e.g., pivot). Vortex roll up off the booms 105 also aids in the effectiveness of the vertical tails 107. Further aerodynamic optimization of the vortex roll-up can allow the vertical tails 107 to be undersized (e.g., have smaller tail volume coefficients) relative to conventional aircraft designs while maintaining similar or better performance.

FIG. 2 provides an example of a cross-sectional view of a jetfoil. A jetfoil 109, from the array of jetfoils 109 and as illustrated in FIG. 2, may be integrated into the ducted wing 103. By directly integrating the duct into the leading edge of jetfoil 109 to form at least a portion of the ducted wing 103, duct drag and weight is minimized while providing minimum fan inflow distortion for lowest noise. The ducted wing 103 aligns the airflow and voids the need for high lift slats. In some examples, each jetfoil 109 includes a propulsor 201 that is configured to generate thrust, an upper wing portion 230, lower wing portion 250, and one or more flaps 210.

In some examples, the upper wing portion 230 of a jetfoil 109 comprises the upper half of the duct that is included in the jetfoil 109. The upper wing portion 230 is configured to control the exhaust flow of the propulsor 201. The lower wing portion 250 is configured to control the different takeoff and landing modes of the aircraft 100. The lower wing portion 250 includes a first lower wing portion 250A at the leading edge of the lower wing portion 250 and extends to a location that is aligned with the aft end of the upper wing portion 230. In some embodiments, the lower wing portion 250 may include a flap configured to pivot between different angles in which specific angles may be associated with specific takeoff and landing modes. For example, one angle of the flap may be associated with a conventional takeoff and landing mode, another angle of the flap may be associated with a vertical takeoff and landing mode, and yet another angle may be associated with a short takeoff and landing mode.

The first lower wing portion 250A overlaps the upper wing portion 230 and is connected to the upper wing portion 230. The upper wing portion 230 and the first lower wing portion 250A collectively form the integrated duct of the jetfoil 109. The propulsor 201 is disposed between the upper wing portion 230 of the jetfoil 109 and the first lower wing portion 250A of the lower wing portion 250.

The lower wing portion 250 also includes a second lower wing portion 250B. The second lower wing portion 250B extends from the end of the first lower wing portion 250A to the trailing edge of the lower wing portion 250. As shown in FIG. 2, the second lower wing portion 250B is non-overlapping with the upper wing portion 230.

In one embodiment, one or more flaps 210 are connected to the upper wing portion 230 and the lower wing portion 250. In one embodiment, flaps 210 include a first flap 210A configured to be attached to the upper wing portion 230 and a second flap 210B configured to be attached to the lower wing portion 250. One end of each flap 210 is configured to be attached to an edge of the ducted wing 103. In one embodiment, one end of one of the flaps 210 is configured to be attached to the trailing edge of the ducted wing 103. In another embodiment, one end of one of the flaps 210 is configured to be attached to the leading edge of the ducted wing 103. Each flap 210 is configured to pivot about the attachment point to the edge of the ducted wing 103. The flap 210 may have a different configuration based on its attachment point.

In some examples, the second flap 210B is configured to pivot about the attachment point to the trailing edge of the lower wing portion 250 and may be configured to direct the airflow from the propulsors 201 to control the lift and drag. The second flap 210B allows for a plurality of takeoff modes, including VTOL, STOL, and CTOL by controlling the direction of airflow from the propulsors 201. In some examples, the first flap 210A is configured to pivot about the attachment point to the trailing edge of the upper wing portion 230 and is configured to control the area of the outlet of the exhaust of the propulsors 201 thereby controlling mass flow conditions for efficient fan operation, and subsequently thrust. In some examples, each flap 210 is a single-element flap. In other embodiments, some of the flaps 210 are a multi-element flap.

In some examples, the ducted wing 103 augments low speed lift from a conventional CLmax of 1.8 to, for example, over 6.0. This enables three times higher wing loading but with three times smaller wing area compared to conventional wing designs. Directly integrating the duct into the airfoil leading edge of the ducted wing 103 also reduces drag at high-speed cruise (e.g., greater than 40%) when compared to conventional wing designs. High lift is achieved without adding a high pitching moment. Furthermore, the integration of the duct into the jetfoil leading edge of the ducted wing 103 improves ride quality and enables a low stall speed of, for example, 61 knots with less than 3,000 takeoff and landing balanced field length.

The array of jetfoils 109 included in the ducted wing 103 augment lift of the wing across multiple speeds and provide thrust throughout the flight envelope. By embedding the array of jetfoils 109 into the ducted wing 103, drag is reduced while simultaneously maximizing the efficiency of thrust generated. In some embodiments, the ducted wing 103 also includes ailerons for roll control as well as additional flaps for trim across various stages of flight.

Flaps 210, including both first flap 210A at the top trailing edge of the ducted wing 103 (e.g., the upper wing portion 230) as well as the second flap 210B at the bottom trailing edge of the ducted wing 103, can deflect in order to tailor the area ratio of the exhaust to the particular cruising speed and ensure that the propulsor exhaust flow remains attached to the upper surface of the lower wing to create efficient thrust production from a propulsor. Tailoring the area ratio ensures optimal efficiency at all cruise speeds without the need for variable pitch propulsor blades. The deflection of the flaps 210 may be automatically scheduled, as a function of the airspeed, mechanically or electronically.

In some examples, due to the propulsor integration into the leading edge of the ducted wing 103, the upper wing portion 230 and the lower wing portion 250 act like a biplane where the vertical portions of the duct array add to the structural rigidity of the structure. As shown in FIG. 2, the lower wing portion 250 is longer than the upper wing portion 230 such that the lower wing portion 250 extends past the end of the first flap 210A that is attached to the upper wing portion 230. The leading-edge integration also ensures that distortion into the propulsor 201 face is reduced across angles of attack and flight speeds. This design improves over designs with integration aft of the leading edge that require additional pylons to avoid boundary layer ingestion, resulting in more drag.

In some examples, a ducted wing 103 may comprise a primary spar and at least two secondary spars for rigidity. The ducted wing 103 may feature as many as 50 propulsors to provide multi-engine redundancy, for example. Each of these propulsors are driven with the same signal(s) from a FADEC (Full Authority Digital Engine Control) so that the pilot can control the thrust across the array of propulsors 201 with a single throttle. Each of the propulsors 201 included in the array of jetfoils 109 is replaceable. The leading edge of the array of propulsors 201 can pivot for maintenance purposes to enable access to maintainers to remove the fan, stators, or electric motor as required. The propulsors 201 might not pivot during each of the different takeoff and landing modes. Sweep can be introduced to the ducted wing 103 to co-locate the center of lift with the center of thrust to avoid any nose down pitching moments across the speed regime. In some examples, depending on the relative arrangement of the booms and tails to the inboard wing, structural weight benefits may also be realized.

As described herein, each duct of the array of jetfoils 109 transitions from an elliptical shape at the inlet lip, to a cylindrical section from the fan face to the stator region, and then into a rectangular cross section that allows the exhaust of the aircraft 100 to form a clean sheet that smoothly attaches to the upper surface of the lower airfoil. The jetfoil 109 is designed to balance aero and thrust considerations without introducing pitching moment. Within the duct is a center body which houses an electric motor that drives each propulsor 201. Wiring to the motor is directed through one or more stators for power and active cooling, if required. In some embodiments, the upper wing portion 230 and the lower wing portion 250 may contain one or more payloads, such as electronics, sensors, fuel, cargo, or mechanical elements.

FIGS. 3A to 3F illustrate different views of an example application of the ducted wings 103 of the aircraft 100. As shown in FIGS. 3A to 3F, the ducted wings 103 includes a plurality of second flaps 210B which can rotate independently of each other. As shown in FIGS. 3A to 3F, the second flaps 210B rotate into a range of positions to allow for a range of takeoff modes.

The combination of the propulsors 201 into an array opens up several control and thrust vectoring opportunities. Thrust can simply be varied between each individual propulsor 201 to induce yawing, rolling, or pitching moments. Relative spanwise pitch differences between the jetfoils 109 can be used to catalyze faster climbs and descents. within some examples, additional control surfaces may be installed at the trailing edge.

The spanwise combination of ducts within the jetfoils 109 support integration along the wing and/or as a biplane wing itself. The array can be arranged and extended as a biplanar wing with sweep, stagger, dihedral and taper to fit system needs. The choice to integrate the array of propulsors 201 as a full biplanar wing is dependent on the amount of thrust (minus drag) required as well as the relative size of the propulsor 201.

Figure 3A:
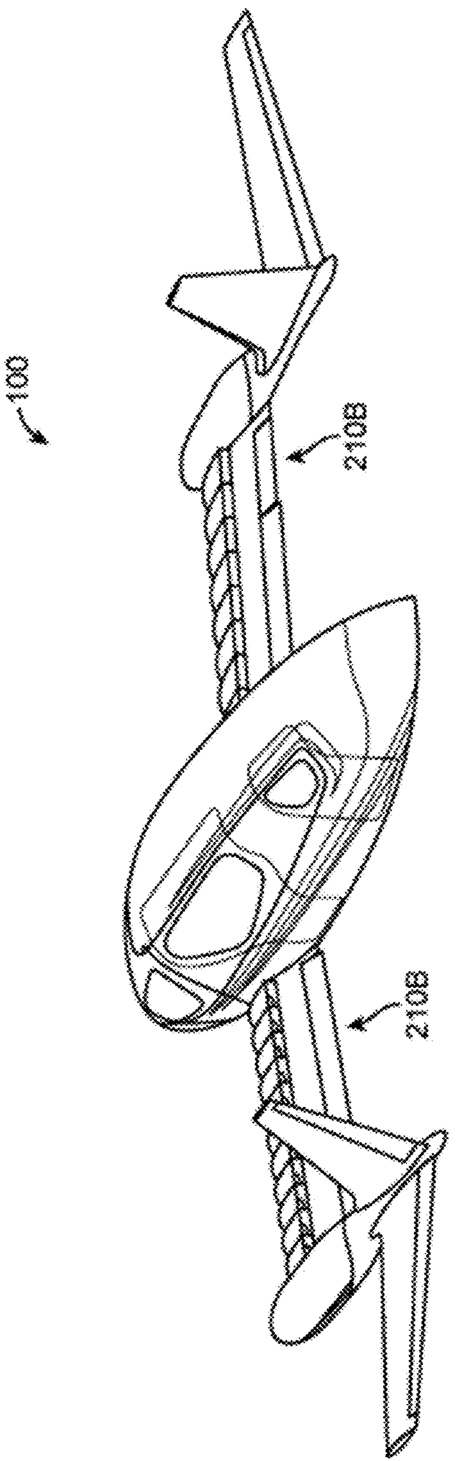
FIGS. 3A, 3B, 3C, 3D, 3E and 3F illustrate various back and side views of an example aircraft in which flaps are set at various angles for different takeoff and landing modes, each according to one or more example arrangements.

For example, FIG. 3A illustrates the position of the second flaps 210B on the lower wing portion 250 for CTOL or during the cruise portion of flight. As shown in FIGS. 3A, 3E, and 3F, the second flaps 210B are in a first position (e.g., a first angle) while the aircraft is in the CTOL mode. The first position of the second flaps 210B is optimized for CTOL or cruising during flight. In one embodiment, the default position of the second flaps 210B maximizes the overall length of the ducted wing 103. The second flaps 210B may be controlled independently of other flaps 210, such as first flaps 210A.

Figure 3B:
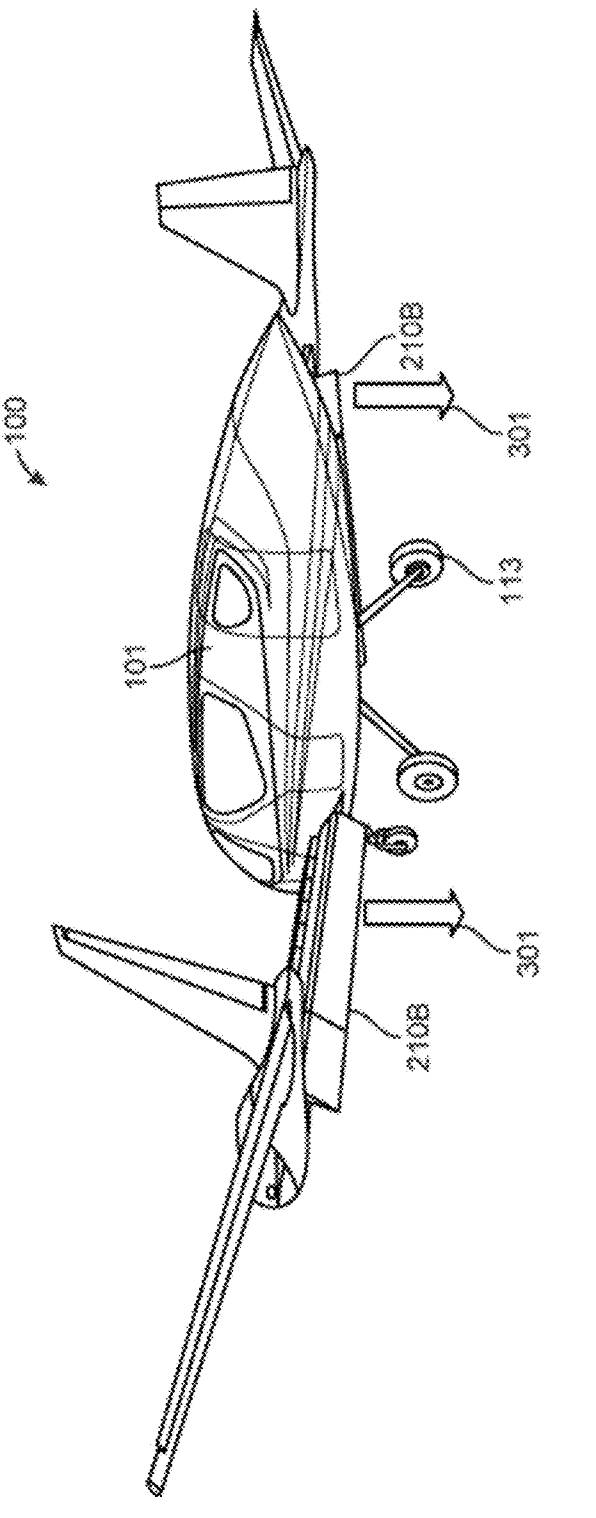
Figures 3C, 3D, 3E, 3F:
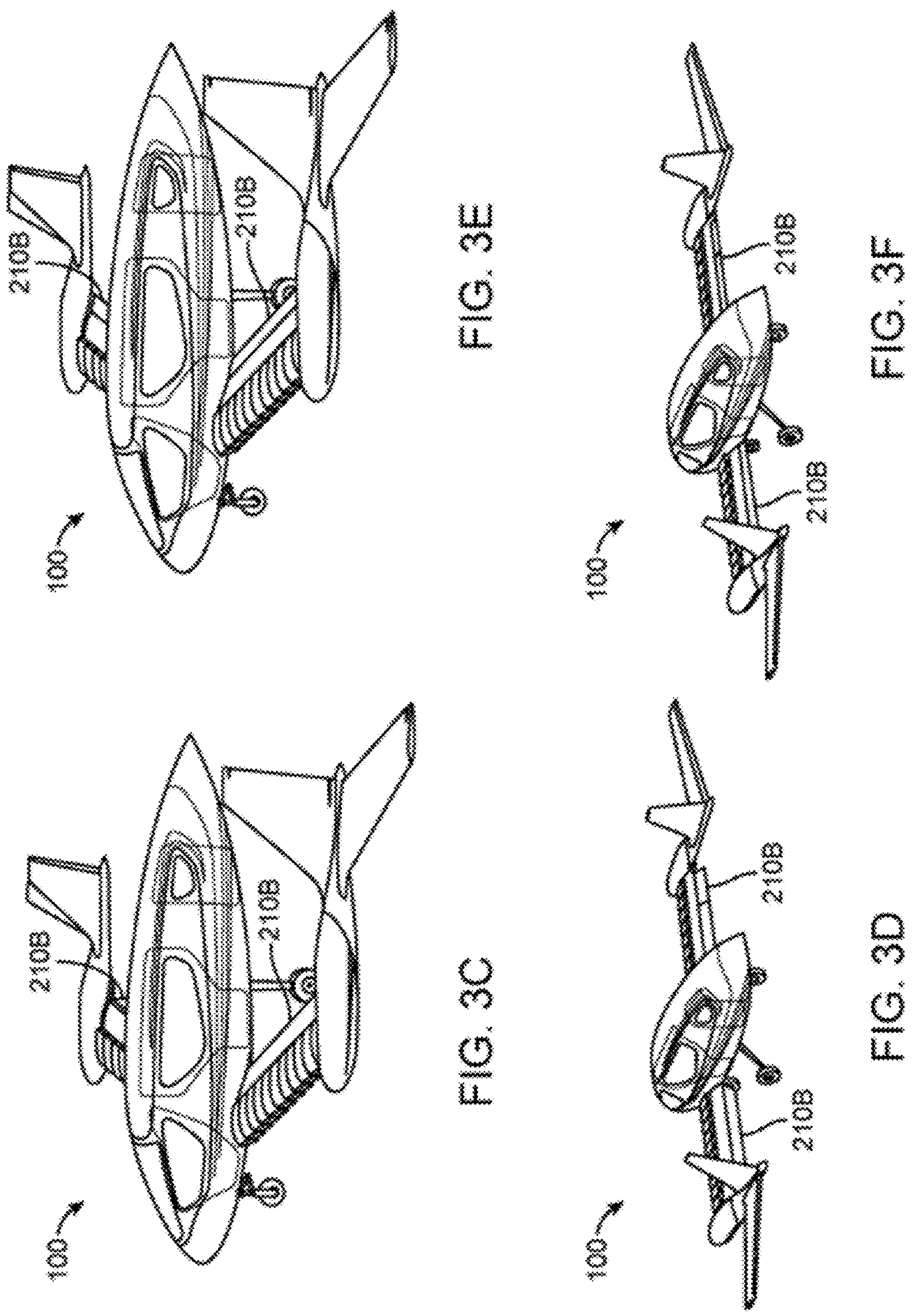

FIG. 3B illustrates a second position of the second flaps 210B on the lower wing portion 250 for VTOL. While the aircraft is in VTOL mode, the second flaps 210B are angled (e.g., pivoted) downward at a maximum angle (e.g., a second angle) of possible pivot of the second flaps 210B to direct the direction of thrust generated by the propulsors 201 in the downward direction as indicated by arrows 301. By directing the thrust downwards, the aircraft 100 is configured for VTOL. In some examples, the maximum angle of pivot of the second flaps 210B is a 75-degree angle.

FIGS. 3C and 3D illustrate a third position of the second flaps 210B on the lower wing portion 250 for STOL. In some examples, the STOL ability of the aircraft 100 enables the aircraft 100 to take off and clear an obstruction with a predetermined height (e.g., 50 feet, and/or other heights) in a predetermined distance (e.g., 1,500 feet, and/or other distances) from the start of the takeoff run and be able to stop within the predetermined distance after crossing the obstacle.

While in the STOL mode, the second flaps 210B are at the third position which is an intermediate position between the first position of the second flaps 210B for CTOL and the second position of the second flaps 210B for VTOL. In some examples, the second flaps 210B are at an intermediate angle between the maximum possible pivot angles of the second flaps 210B for VTOL and the angle of the second flaps 210B for CTOL. FIGS. 3E and 3F illustrate the second flaps 210B on the lower wing portion 250 for CTOL, in the position optimized for CTOL, as a comparison to FIGS. 3C and 3D.

Note that in some examples, in the CTOL mode, the STOL mode, and the VTOL mode, the angle of the propulsors 201 that are integrated into the ducted wing 103 is fixed. That is, the propulsors 201 do not rotate to change the direction of thrust to allow for CTOL, STOL, or VTOL. Rather, the position (e.g., angle) of the second flaps 210B changes to enable each mode of the aircraft 100 and the propulsors 201 maintain a fixed angle during the different modes of the aircraft 100.

Figures 4A, 4B:
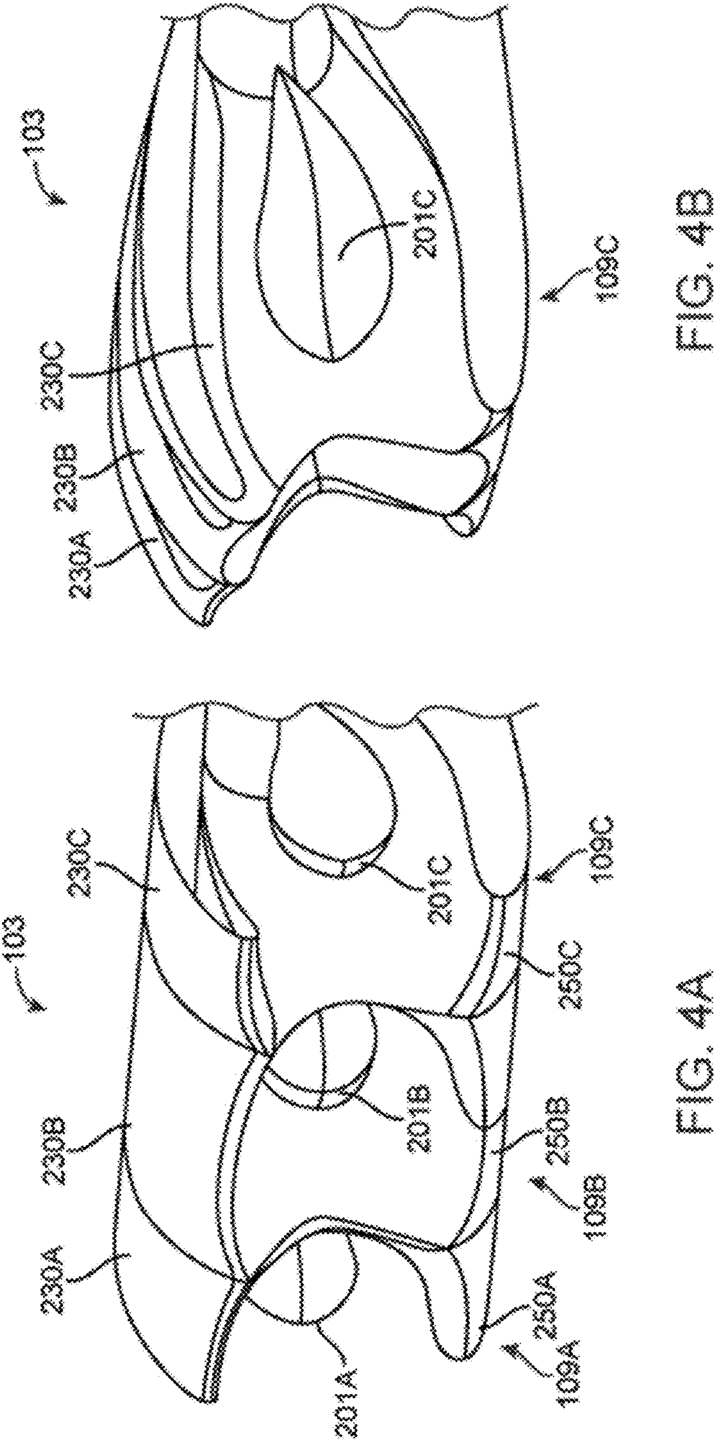
FIGS. 4A and 4B respectively illustrate a perspective view and a side view of an example array of jetfoils, each according to one or more example arrangements.

FIGS. 4A and 4B respectively illustrate a perspective view and a cross-sectional view of an array of jetfoils 109 that form the ducted wing 103. FIGS. 4A and 4B illustrate the different jetfoils 109 that collectively make up the ducted wing 103. In some examples, the array of jetfoils 109 includes a first jetfoil 109A, a second jetfoil 109B, and a third jetfoil 109C that are laterally arranged to form a portion of the ducted wing 103. The first jetfoil 109A includes a first propulsor 201A, a first upper wing portion 230A, and a first lower wing portion 250A. In some examples, the second jetfoil 109B includes a second propulsor 201B, a second upper wing portion 230B that is connected to and extends from an end of the first upper wing portion 230A of the first jetfoil 109A, and a second lower wing portion 250B that is connected to and extends from an end of the first lower wing portion 250A of the first jetfoil 109A. In some examples, the third jetfoil 109C includes a third propulsor 201C, a third upper wing portion 230C that is connected to an extends from an end of the second upper wing portion 230B of the second jetfoil 109B, and a third lower wing portion 250C that is connected to an extends from an end of the second lower wing portion 250B of the second jetfoil 109B. While there are three jetfoils 109 shown in FIGS. 4A and 4B, it should be understood that there can be any number of jetfoils in the array of jetfoils 109 without departing from the scope of this disclosure.

In some embodiments, as shown in FIGS. 4A and 4B, the connections between the first upper wing portion 230A, the second upper wing portion 230B, and the third upper wing portion 230C, as well as between the first lower wing portion 250A, the second lower wing portion 250B, and the third lower wing portion 250C, respectively, are curved rather than straight rectangular lines and edges. In these embodiments, the inlets and outlets of the corresponding propulsor 201 may comprise a conical shape, and the flaps 210 which follow those edges may be similarly curved. One benefit of this curve is that it may require less material, and have corresponding weight benefits. In other examples not shown, the connections between propulsors 201 may be smoother, leading to a straight-line edge between each of the upper wing portions 230 and lower wing portions 250. In these examples, in which the upper wing portion 230 has an edge that is not curved, but instead straight, and the lower wing portion 250 has an edge that is not curved, but instead straight, the airflow over the ducted wing 103 will be more uniform and resemble more of a 2-dimensional flow across the full ducted wing 103. Further, in these embodiments with straighter edges, the corresponding flaps 210 will match the shape of the edges of the upper wing portion 230 and lower wing portion 250.

Figure 5A:
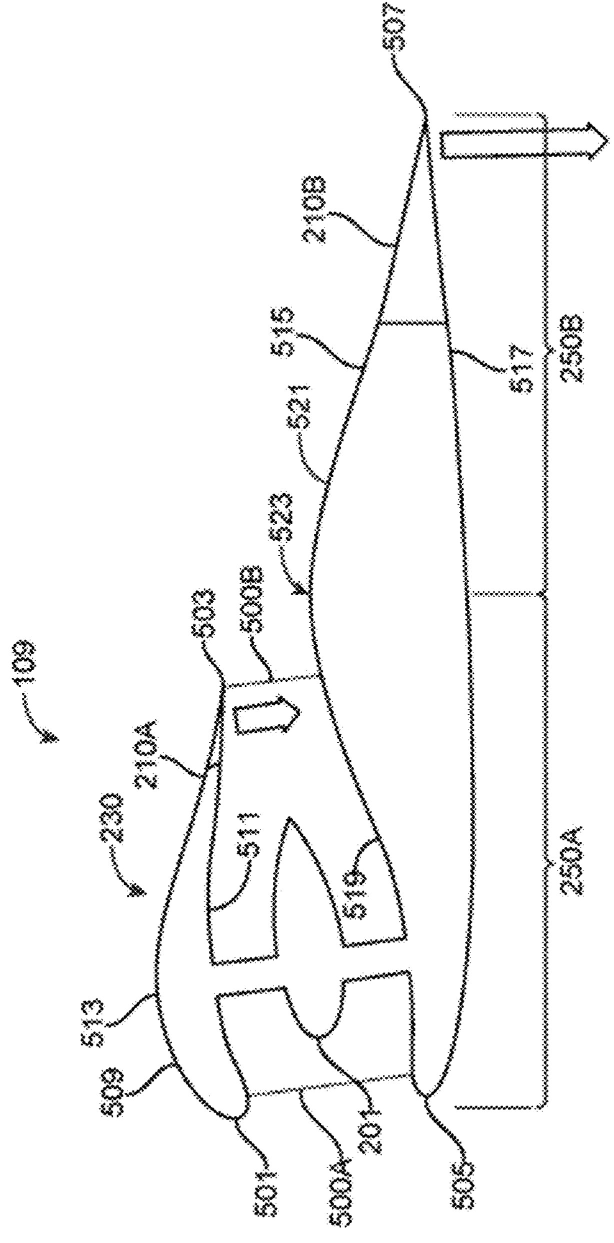
FIGS. 5A, 5B, 5C, and 5D respectively illustrate a cross-sectional view of an example jetfoil of a ducted wing with flaps at the trailing edges of the jetfoil, a cross-sectional view of an example jetfoil of a ducted wing with flaps at the trailing edge and a leading edge of the jetfoil, a cross-sectional view of an example jetfoil of a ducted wing with flaps at the trailing edges and another leading edge of the jetfoil, and a cross-sectional view of an example jetfoil of a ducted wing with flaps at the trailing edges and the leading edges of the jetfoil, each according to one or more example arrangements.
Figure 5B:
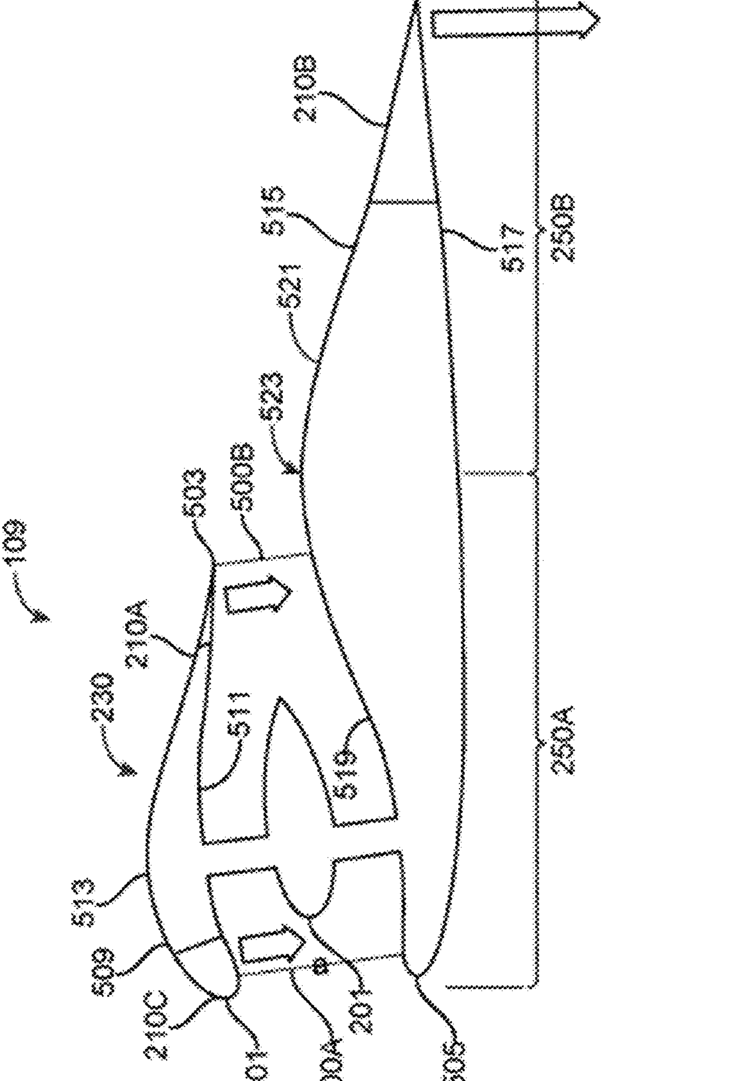
Figure 5C:
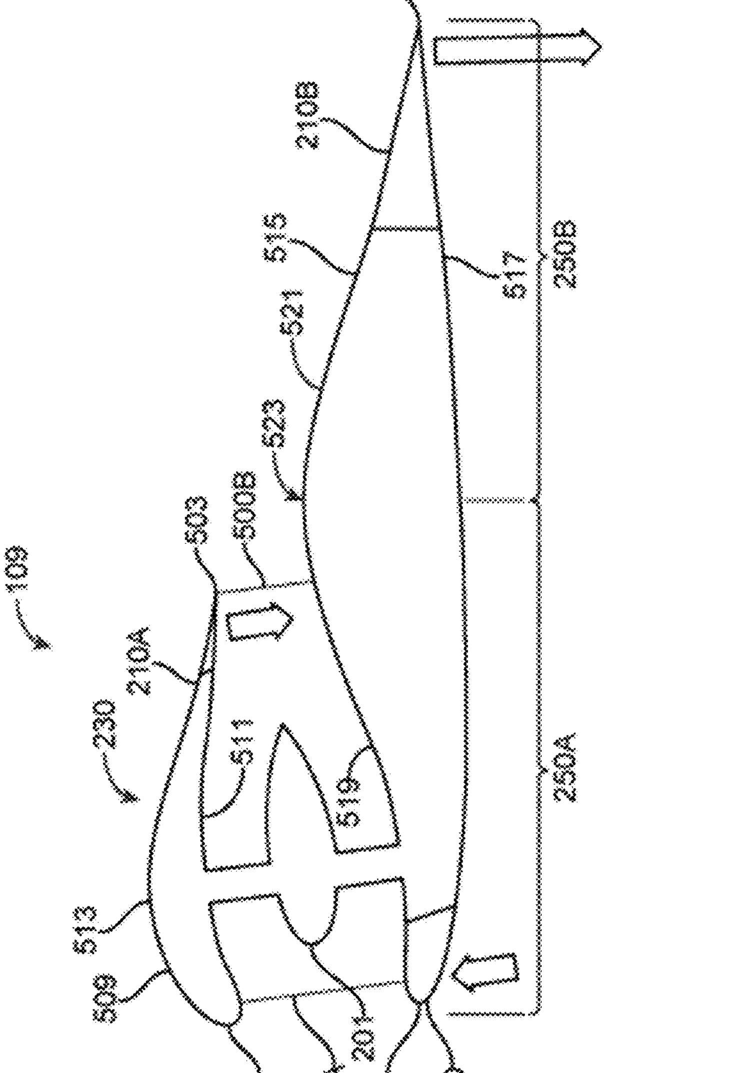
Figure 5D:
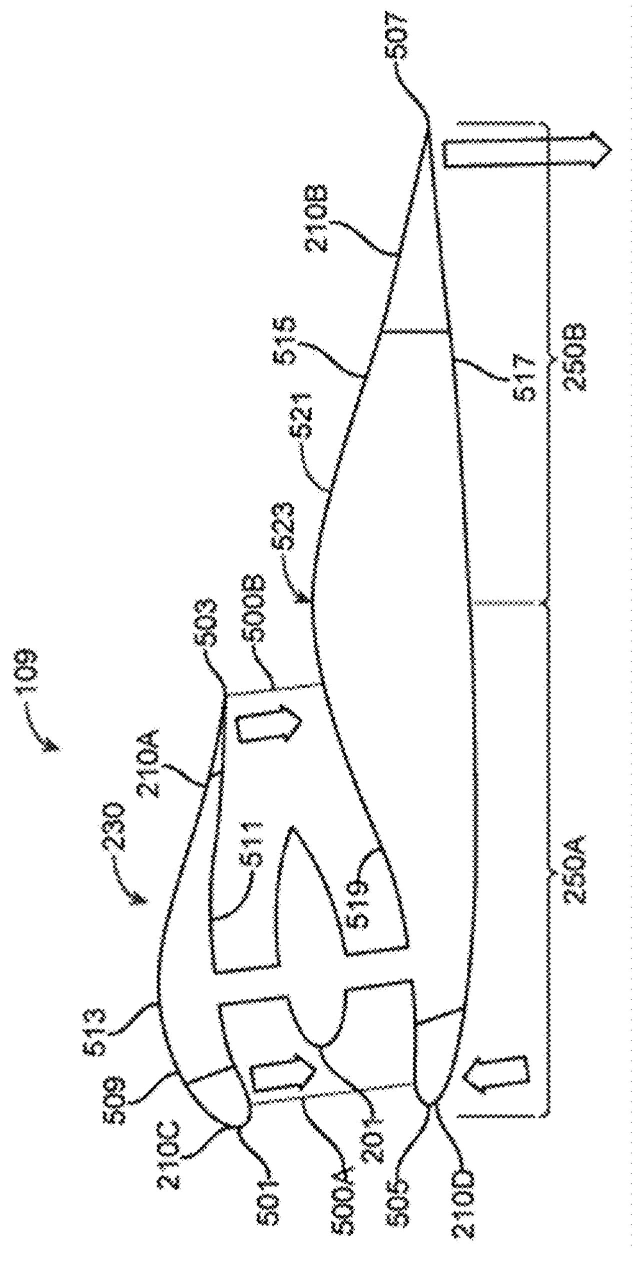

FIGS. 5A to 5D illustrate cross-sectional views of a jetfoil 109 included in the ducted wing 103 according to some examples, with a variety of flap arrangements. Specifically, FIG. 5A illustrates a cross-sectional view of a jetfoil 109 including the first flap 210A and the second flap 210B as previously described above. FIG. 5B illustrates a cross-sectional view of a jetfoil 109 also including a third flap 210C in addition to the first flap 210A and the second flap 20B. FIG. 5C illustrates a cross-sectional view of a jetfoil 109 also including a fourth flap 210D in addition to the first flap 210A and the second flap 20B. FIG. 5D illustrates a cross-sectional view of a jetfoil 109 including both the third flap 210C and the fourth flap 210D in addition to the first flap 210A and the second flap 20B. Each of the plurality of flaps 210 are controlled independently of each other.

Referring to FIG. 5A, in some examples, each jetfoil 109 includes a propulsor 201 with an inlet diameter and an outlet diameter. The jetfoil 109 has an inlet 500A with a corresponding inlet diameter and an outlet 500B with a corresponding outlet diameter with a default position in which the inlet diameter exceeds the outlet diameter.

The upper wing portion 230 includes a first end 501 and a second end 503 that is opposite the first end 501. The lower wing portion 250 also includes a first end 505 and a second end 507 that is opposite the first end 505 of the lower wing portion 250. In some examples, each of the first end 501 of the upper wing portion 230 and the first end 505 of the lower wing portion 250 is rounded as shown in FIG. 5A.

In some examples, the first end 501 (i.e., leading edge) of the upper wing portion 230 is forward of the first end 501 (i.e., leading edge) of the lower wing portion 250. That is, the first end 501 of the upper wing portion 230 extends past the first end 505 of the lower wing portion 250 such that the first end 501 of the upper wing portion 230 is non-overlapping with the first end 505 of the lower wing portion 250. This results in an inlet surface area of the jetfoil 109 which is canted, rather than perpendicular to the flow of air. The canted inlet surface area aids low speed performance and reduces inlet flow field distortion.

In some examples, the upper wing portion 230 has an outer surface 509 that is convex in shape and an inner surface 511 that is concave in shape. The outer surface 509 of the upper wing portion 230 is not parallel with the inner surface 511 of the upper wing portion 230 as shown in FIG. 5A. In some examples, the thickness of the upper wing portion 230 varies from the first end 501 of the upper wing portion 230 to the second end 503 of the upper wing portion 230. For example, the thickness of the upper wing portion 230 may increase from the first end 501 of the upper wing portion 230 to an intermediate portion 513 of the upper wing portion 230 that is between the first end 501 and the second end 503 of the upper wing portion 230. In some examples, the intermediate portion 513 corresponds to (e.g., overlaps) the location of the propulsor 201 within the jetfoil 109. In these examples, the thickest portion of the upper wing portion 230 is aligned with the propulsor 201. The thickness of the upper wing portion 230 decreases from the intermediate portion 513 of the upper wing portion 230 to the second end 503 of the upper wing portion 230.

The lower wing portion 250 has an inner surface 515 that faces the inner surface 511 of the upper wing portion 230. The inner surface 515 of the lower wing portion 250 is connected to the inner surface 511 of the upper wing portion 230 to collectively form the inner surface of the duct of the jetfoil 109 in which the propulsor 201 is disposed. The inner surface 515 of the lower wing portion 250 includes a first portion 519 that is concave in shape and a second portion 521 that is convex in shape.

In some examples, the concave first portion 519 of the inner surface 515 of the lower wing portion 250 overlaps the concave inner surface 511 of the upper wing portion 230. In some examples, the concave first portion 519 of the inner surface 515 of the lower wing portion 250 is included in the first lower wing portion 250A described herein. The propulsor 201 is disposed between the concave first portion 519 of the inner surface 515 of the lower wing portion 250 and the concave portion of the inner surface 511 of the upper wing portion 230 that form the duct of the jetfoil 109. In some examples, the duct formed by the upper wing portion 230 and the lower wing portion 250 has a maximum inner diameter in the concave first portion 519 of the inner surface 515 of the lower wing portion 250 and the concave inner surface 511 of the upper wing portion 230 that overlaps the propulsor 201. As shown in FIG. 5A, the propulsor 201 is closer to the inlet 500A than the outlet 500B of the duct.

The convex second portion 521 of the upper inner surface 515 of the lower wing portion 250 is included in the second lower wing portion 250B and is thus non-overlapping with the upper wing portion 230. The lower wing portion 250 also has an outer surface 517. The outer surface 517 of the lower wing portion 250 is convex in shape from the first end 505 of the lower wing portion 250 to the second end 507 of the lower wing portion 250.

In some examples, the thickness of the lower wing portion 250 varies from the first end 505 of the lower wing portion 250 to the second end 507 of the lower wing portion 250. For example, the thickness of the lower wing portion 250 may increase from the first end 505 of the lower wing portion 250 to an intermediate portion 523 of the lower wing portion 250 that corresponds to (e.g., overlaps) the second end 503 of the upper wing portion 230. In these examples, the thickest portion of the lower wing portion 250 is aligned with the second end 503 of the upper wing portion 230. The thickness of the lower wing portion 250 decreases from the intermediate portion 523 of the lower wing portion 250 to the second end 507 of the lower wing portion 250.

As a result of the concave and convex shapes of both of the inner surface 511 of the upper wing portion 230, and the inner surface 515 of the lower wing portion 250, an inner diameter (and therefore the area) of the duct of the jetfoil varies from both of the first end 501 of the upper wing portion 230, and the first end 505 the lower wing portion 250 to the second end 503 of the upper wing portion 230 and the intermediate portion 523 of the lower wing portion 250. As shown in FIG. 5A, the diameter (and therefore the area) of the duct increases from the inlet 500A of the jetfoil to a portion of the duct overlapping the intermediate portion 513 of the upper wing portion, and decreases from the intermediate portion 513 to the outlet 500B of the duct between the second end 503 of the upper wing portion 230 and the intermediate portion 523 of the lower wing portion 250.

As described herein, one or more flaps 210 may be connected to the jetfoil 109. In FIG. 5A, the second end 503 of the upper wing portion 230 includes a first flap 210A and the second end 507 of the lower wing portion 250 includes a second flap 210B. The first flap 210A is configured to control the outlet area of the outlet 500B (e.g., exhaust outlet) of the jetfoil 109. That area of outlet 500B may be decreased from its maximum area to a minimum outlet area by pivoting the first flap 210A downward thereby changing the angle of the first flap 210A, and changing the diameter of the outlet. Control of outlet area of the jetfoil 109 allows for optimized air flow at various speeds of the aircraft 100 and allows for maximum efficiency across various speeds.

In contrast, the second flap 210B controls the direction of the exhaust flow thereby changing the direction of thrust. As mentioned previously, the angle (e.g., position) of the second flap 210B corresponds to a particular mode of the aircraft 100. In FIG. 5A, the angle of the second flap 210B corresponds to the CTOL mode, but the second flap 210B may be angled downwards to a maximum angle corresponding to the VTOL mode of the aircraft 100 or an intermediate angle that corresponds to the STOL mode of the aircraft 100.

FIG. 5B illustrates another embodiment of the jetfoil 109. The embodiment shown in FIG. 5B is similar to the embodiment shown in FIG. 5A. Thus, components common to both the embodiments in FIGS. 5A and 5B are omitted from each description.

In the embodiment of FIG. 5B, a third flap 210C is added to the first end 501 of the upper wing portion 230. Thus, the jetfoil 109 in FIG. 5B includes the first flap 210A at the second end 503 of the upper wing portion 230, the second flap 210B at the second end 507 of the lower wing portion 250, and the third flap 210C at the first end 501 of the upper wing portion 230. The first flap 210A and the second flap 210B perform the same functions described above with respect to FIG. 5A. The third flap 210C may be configured to be positioned at different angles to change the inlet area of the inlet 500A of the jetfoil 109. For example, the angle of the third flap 210C may be changed downward toward a center of the propulsor 201 to control the inlet area of the inlet 500A of the jetfoil 109. Control of the inlet area in addition to the outlet area of the jetfoil 109 further optimizes the inlet airflow at various speeds of the aircraft 100 to maximize efficiency across the various speeds.

FIG. 5C illustrates another embodiment of the jetfoil 109. The embodiment shown in FIG. 5C is similar to the embodiment shown in FIG. 5A. Thus, components common to both the embodiments in FIGS. 5A and 5C are omitted for each of description.

In the embodiment of FIG. 5C, a fourth flap 210D is added to the first end 505 of the lower wing portion 250. Thus, the jetfoil 109 in FIG. 5C includes the first flap 210A at the second end 503 of the upper wing portion 230, the second flap 210B at the second end 507 of the lower wing portion 250, and the fourth flap 210D at the first end 505 of the lower wing portion 250. The first flap 210A and the second flap 210B perform the same functions described above with respect to FIG. 5A. The fourth flap 210D may be configured to be positioned at different angles to change the inlet area of the inlet 500A of the jetfoil 109. For example, the angle of the fourth flap 210D may be changed upward toward a center of the propulsor 201 to control the inlet area of the inlet 500A of the jetfoil 109. Control of the inlet area in addition to the outlet area of the jetfoil 109 further optimizes the inlet airflow at various speeds of the aircraft 100 to maximize efficiency across the various speeds.

FIG. 5D illustrates yet another embodiment of the jetfoil 109. The embodiment shown in FIG. 5D is similar to the embodiments shown in FIGS. 5A to 5C. Thus, components common to both the embodiments in FIG. 5A to 5C are omitted for each description.

In the embodiment of FIG. 5D, the third flap 210C is added to the first end 501 of the upper wing portion 230 and the fourth flap 210D is added to the first end 505 of the lower wing portion 250. Thus, the jetfoil 109 in FIG. 5D includes the first flap 210A at the second end 503 of the upper wing portion 230, the second flap 210B at the second end 507 of the lower wing portion 250, the third flap 210C at the first end 501 of the upper wing portion 230, and the fourth flap 210D at the first end 505 of the lower wing portion 250. The first flap 210A and the second flap 210B perform the same functions described above with respect to FIG. 5A. The third flap 210C and the fourth flap 210D may be configured to be positioned at different angles to change the inlet diameter of the inlet 500A of the jetfoil 109, and therefore change the inlet area of the inlet 500A of the jetfoil 109. By having both the third flap 210C and the fourth flap 210D, the inlet area of the inlet 500A of the jetfoil 109 can be adjusted more compared to the embodiments of FIGS. 5B and 5C with a single flap 210 at the inlet of the jetfoil 109 to further optimize the inlet airflow at various speeds of the aircraft 100.

In some examples, the ducted wing 103 may include a control mechanism connected to each flap 210 to control the angle of the flap 210. The control mechanism may include a servo motor and a rod. One end of the rod is connected to the servo motor and a second end of the rod is connected to the second flap 210B. The servo motor may extend the rod to pivot the flap 210 towards its maximum possible angle and may retract the rod to return the rod to its default position.

Although FIGS. 2 to 5D and the accompanying descriptions reference the examples of an aircraft implementing a jetfoil as depicted in FIG. 2, it should be understood that these are merely illustrative examples of a jetfoil as described herein. It should be understood that aircraft may implement jetfoils, and associated structural elements, with one or more variations in design and/or function (e.g., as described herein with respect to FIGS. 6A to 16) to achieve the benefits associated with exhaust area and flow turning control without departing from the scope of this disclosure.

Figure 6A:
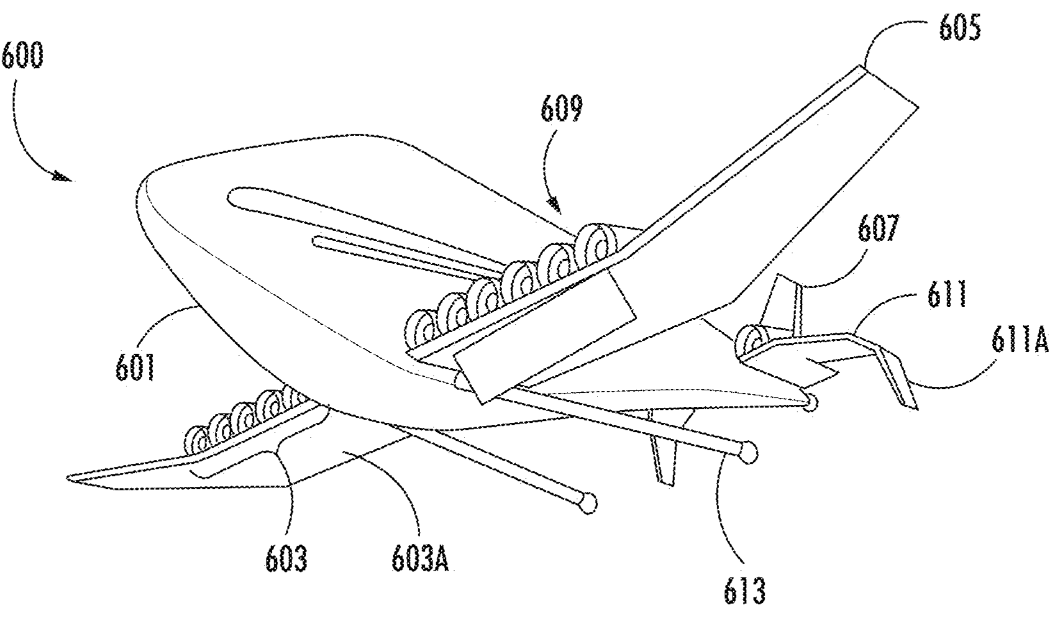
FIGS. 6A and 6B respectively illustrate a front view and a back view of an example aircraft with an integrated array of ducted fans in forward flight, each according to one or more example arrangements.
Figure 6B:
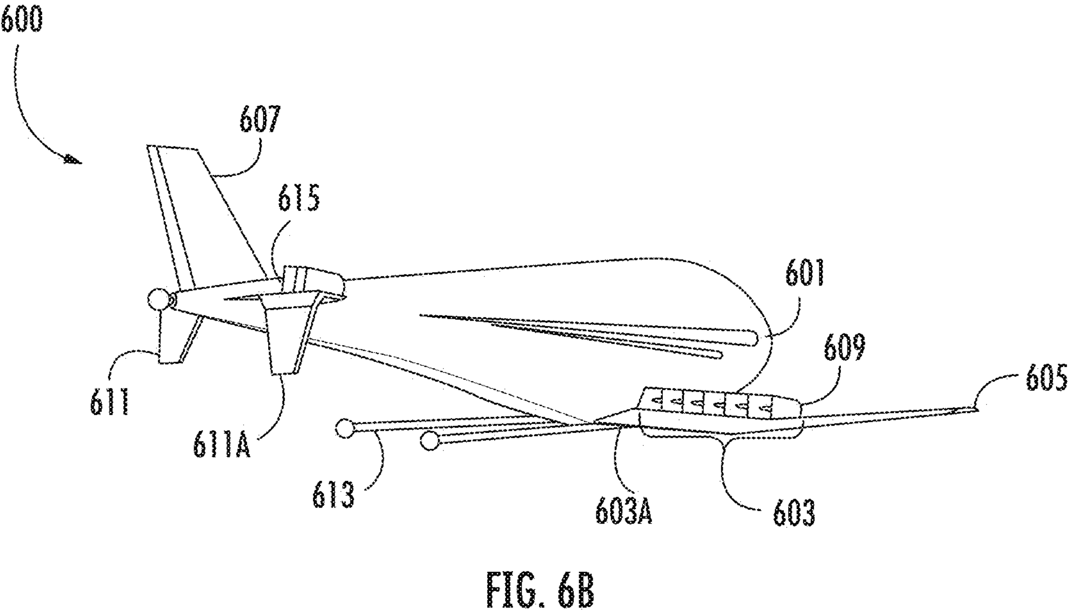

FIGS. 6A and 6B respectively illustrate a front view and a back view of an example aircraft 600 with an integrated array of ducted fans in forward flight capable of flow turning and thrust vectoring via an embodiment of a jetfoil integration. The aircraft 600 may be a passenger aircraft, a drone, and/or any other type of aircraft or vehicle. It is to be noted that the views of aircraft 100 are for illustrative purposes and thus this disclosure is not to be limited to such dimensions, ratios, profiles, or the like. It should also be noted, however, that the ratios, profiles, dimensions, and/or other depicted characteristics shown or gleaned from the illustrated embodiments described herein may be novel features.

Figures 8A, 8B, 8C, 8D:
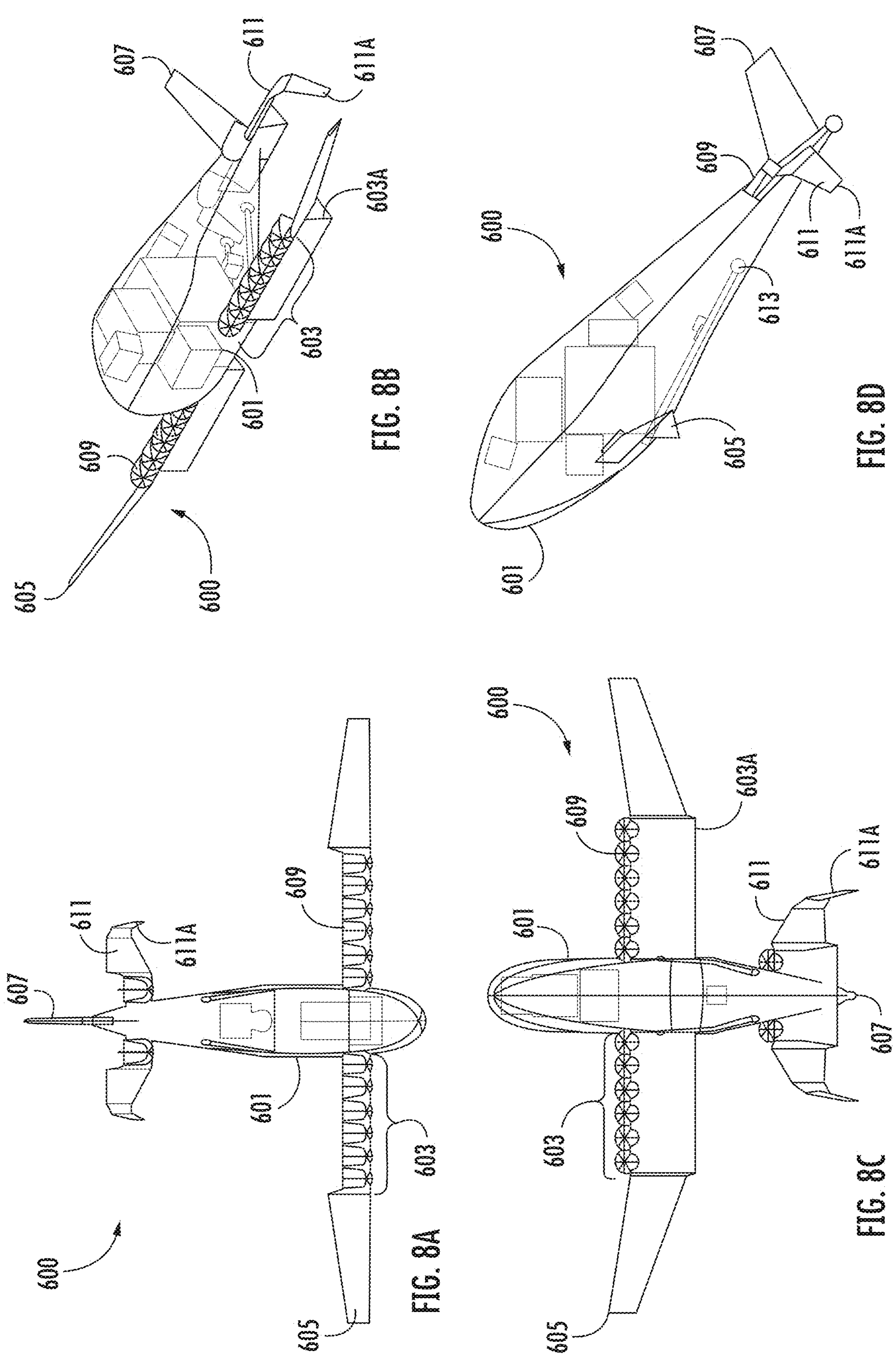
FIGS. 8A, 8B, 8C, and 8D respectively illustrate a top view, a front view, a bottom view, and a side view of an example aircraft with an integrated array of ducted fans in a hover mode, each according to one or more example arrangements.
Figures 9A, 9B, 9C, 9D:
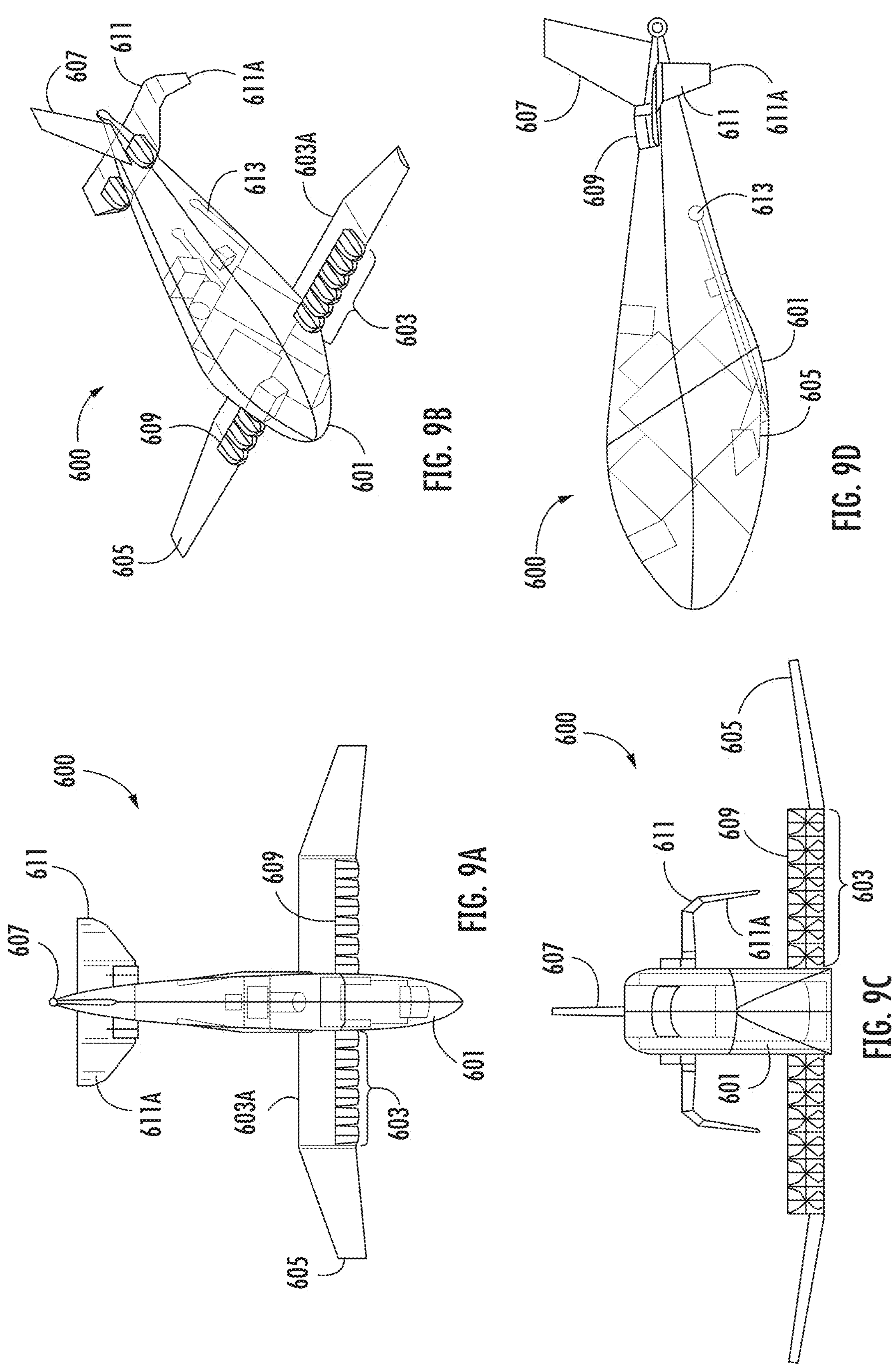
FIGS. 9A, 9B, 9C, and 9D respectively illustrate a top view, a front view, a rear view, and a side view of an example aircraft with an integrated array of ducted fans in a forward flight mode, each according to one or more example arrangements.

The aircraft 600 comprises a fuselage 601. The fuselage 601 may, in some examples, have a substantially teardrop-shaped profile when viewed at certain angles from the front (FIG. 6A), the back (FIG. 6B), the top (FIG. 8A), or the bottom (FIG. 8C). In some examples, the fuselage 601 may be sized such that the fuselage 601 has the capacity to include an avionics suite, one or more batteries, a payload (e.g., a number of passengers, a package, or the like), and/or other components of an aircraft as described herein. For example, the size of the fuselage 601 may be increased in some examples to facilitate easier battery swapping by giving a human operator more space to manipulate batteries within the fuselage 601. In some examples, the fuselage 601 may be sized to comply with one or more regulations, design preferences, or other parameters. For example, the fuselage 601 may be sized to ensure that a total weight of the aircraft 600 does not exceed a threshold weight (e.g., 55 pounds, and/or other thresholds).

The aircraft 600 also includes a main wing assembly 605. The main wing assembly 605 comprises a plurality of wings (e.g., two wings) attached to the fuselage 601. The main wing assembly 605 is be configured to facilitate takeoff, flight, and landing. The main wing assembly 605 may have a wingspan of less than 2.50 meters. The illustrated main wing assembly 605 comprises an integrated array of ducted fans 603. In some examples, the main wing assembly 605 may comprise two or more integrated arrays of ducted fans 603 on opposite sides of the fuselage 601. In some examples, an integrated array of ducted fans 603 is positioned at a leading edge of main wing assembly 605 (e.g., as shown in FIGS. 6A and 6B). In some examples, an integrated array of ducted fans 603 may be positioned abutting the fuselage 601 and/or connected to the fuselage 601 (e.g., as shown in FIGS. 6A and 6B). It should be noted that the integrated array of ducted fans 603 may be positioned at different locations of the main wing assembly 605 and at different locations relative to the fuselage 601 without departing from the scope of this disclosure. In some examples, the integrated arrays of ducted fans 603 occupy a majority of a length of the main wing assembly 605. For example, the integrated arrays of ducted fans 603 may occupy at least 80% of the main wing assembly 605, at least 90% of the main wing assembly 605, or substantially all of the main wing assembly 605. In some examples, the integrated arrays of ducted fans 603 may occupy a length less than 2.5 meters (e.g., between 2.46 and 2.49 meters). An integrated array of ducted fans may include a movable trailing edge. In some examples, the movable trailing edge may move via articulation. In some examples, the movable trailing edge may move via extension and retraction. The integrated array of ducted fans 603, in this example, includes an articulatable edge 603A (e.g., a flap, or the like) that moves via articulation, which may be referred to as an articulatable trailing edge. For example, the integrated array of ducted fans 603 may include an articulatable edge 603A spanning a length of the integrated array of ducted fans 603 (e.g., extending from a first terminal end of the integrated array of ducted fans 603 to a second terminal end of the integrated array of ducted fans 603). Each ducted fan included in the integrated array of ducted fans 603 may include and/or correspond to a portion of the articulatable edge 603A.

An integrated array of ducted fans 603 may be and/or comprise a plurality of ducted fans 609 (e.g., a plurality of ducted fans integrated into a jetfoil, as described herein). Each ducted fan 609 may comprise a number of blades and be characterized by a particular blade passage frequency (BPF), including the example parameters disclosed herein. Each ducted fan 609 may comprise an articulatable edge that is articulated to achieve exhaust area and flow turning control as described herein. The articulatable edge of a ducted fan 609 may be and/or include a portion of the articulatable edge 603A of the integrated array of ducted fans 603. Thus, it should be understood that the articulatable edge of a given ducted fan 609 may be articulated together (e.g., simultaneously) with the articulatable edges of each ducted fan 609 when articulatable edge 603A is articulated. In some examples, the articulatable edge of a ducted fan 609 may additionally or alternatively be articulated independent of any articulatable edges of other ducted fans 609. Each ducted fan 609 may be aligned with a longitudinal axis of the aircraft 600 to eliminate the complexity of inlet lip separation required by some conventional aircraft. Main wing assembly 605 may, in some examples, extend straight (e.g., extending at a 90 degree angle) from the fuselage 601. It should be understood that in other examples the main wing assembly 605 may be characterized by a forward sweep, a backward sweep, an anhedral configuration, a dihedral configuration, and/or by other relationships to the fuselage 601 without departing from the scope of this disclosure. In some examples, terminal ends of the main wing assembly 605 may comprise one or more additional elements, such as batteries, sensors, navigation lights, cargo/payloads, and/or other miscellaneous equipment specific to one or more functions or missions of the aircraft 600. For example, as illustrated in FIGS. 6A and 6B, the terminal ends of the main wing assembly 605 are and/or include navigation lights designed to assist with safe takeoff, flight, and landing of the aircraft 600. In some examples, the additional elements at the terminal ends of the main wing assembly 605 may be located with a boom or booms as described herein.

The aircraft 600 may additionally or alternatively comprise an empennage. For example, the aircraft 600 may include an empennage with one or more tails connected to a rear portion of the fuselage 601 and designed to improve stability of the aircraft 600. The empennage may include one or more vertical tails 607 and one or more horizontal tails 611. Vertical tails 607 provide yaw stability by preventing the aircraft 600 from rolling during flight. In some examples, a vertical tail 607 includes a rudder component that assists with turning of the aircraft 600 during flight and/or during a hover mode. For example, the rudder component allows the aircraft 600 to turn into a direction of wind flow during a hover mode to improve stability of the aircraft 600. The horizontal tails 611 may include a ducted fan 609 and/or an integrated array of ducted fans 603. For example, as illustrated in FIGS. 6A and 6B, the aircraft 600 may include two horizontal tails 611, each with a single ducted fan 609. In these examples, the articulatable edge of the ducted fan 609 on a horizontal tail 611 may be articulated independent of any other articulatable edges. In certain examples, a ducted fan 609 attached to a horizontal tail 611 includes a vertical vane 615. The vertical vane 615 may be positioned in a flow path of the airflow produced by a propulsor fan and/or other fan element of the ducted fan 609. The vertical vane 615 provides yaw control to improve stability of the aircraft 600 in high winds. For example, the vertical vane 615 may be manipulated/controlled to adjust an orientation of the aircraft 600 and prevent the aircraft 600 from rolling (e.g., due to wind and/or other flight conditions).

In some examples, the horizontal tails 611 may extend straight (e.g., at a 90 degree angle) from the rear portion of the fuselage 601. In some examples, a horizontal tails 611 may include a tail tip device ("taillet") 611A. The tail tip device 611A may have different shapes and different configurations (e.g., one or more curves, bends, or the like) designed to provide additional benefits. Tail tip devices 611A may include a single curve, bend, or the like forming a continuous angle/arc, or a number of curves, bends, or the like forming a number of different angles/arcs between the horizontal tail 611 and the taillet 611A. For example, as illustrated in FIGS. 6A and 6B, one or more horizontal tails 611 may include a dropped (e.g., downwardly curving or downwardly bending) tail tip device 611A positioned partway along a length of the horizontal tail causing a portion of the horizontal tail to achieve a perpendicular position relative to the ground during operation of the aircraft 600. In certain examples, a tail tip device 611A may produce benefits that are not achievable with a conventional straight horizontal tail. For example, the tail tip device 611A may be configured to include the curves, bends, or the like described herein to provide additional stability to the aircraft 600, produce lift, reduce drag, and/or otherwise improve the performance of the aircraft 600.

It should be understood that the wing assemblies 605 and horizontal tails 611 described herein may comprise any number of ducted fans 609. For example, as shown in FIGS. 6A to 6B, the main wing assembly 605 may include integrated arrays of ducted fans 603 comprising a total of 12 ducted fans 609. The horizontal tails 611 may each include a single ducted fan 609, resulting in a total of 14 ducted fans 609 attached to the aircraft 600. It should be understood that any number of alternative quantities or configurations of ducted fans 609 are included within this disclosure. For example the quantity of ducted fans included on the wing assembly and/or on a horizontal tail may be different than the quantity shown in the figures (e.g., FIGS. 6A to 6B). The wing assembly may include a different quantity of ducted fans on opposite wings. For example, the left wing of a wing assembly may include more or fewer ducted fans than a right wing of the wing assembly. The horizontal tails may include a different quantity of ducted fans. For example, a left tail may include more or fewer ducted fans than a right tail of the aircraft. A left wing may include, for example, 1 to 16 ducted fans. A right wing may include, for example, 1 to 16 ducted fans. A left tail may include, for example, 0-4 ducted fans. A left wing, for example, may include 0-4 ducted fans.

In some examples, the aircraft 600 may include one or more landing mechanisms 613. The one or more landing mechanisms 613 may comprise wheels, support struts, landing gears, floats, pontoons, and/or other components used for landing and takeoff of the aircraft 600. The one or more landing mechanisms 613 may also include electronics, pneumatics, and/or other components designed to raise, retract, and/or otherwise move the landing mechanisms 613 between a plurality of configurations. For example, as shown in FIGS. 6A to 7B, the landing mechanisms 613 may comprise a plurality of support struts with components designed to move the landing mechanisms 613 between a first configuration for forward flight (FIGS. 6A and 6B) and a second configuration for landing or maintaining a position relative to a landing surface (e.g., grass, concrete, water, and/or other landing surfaces).

Figure 7A:
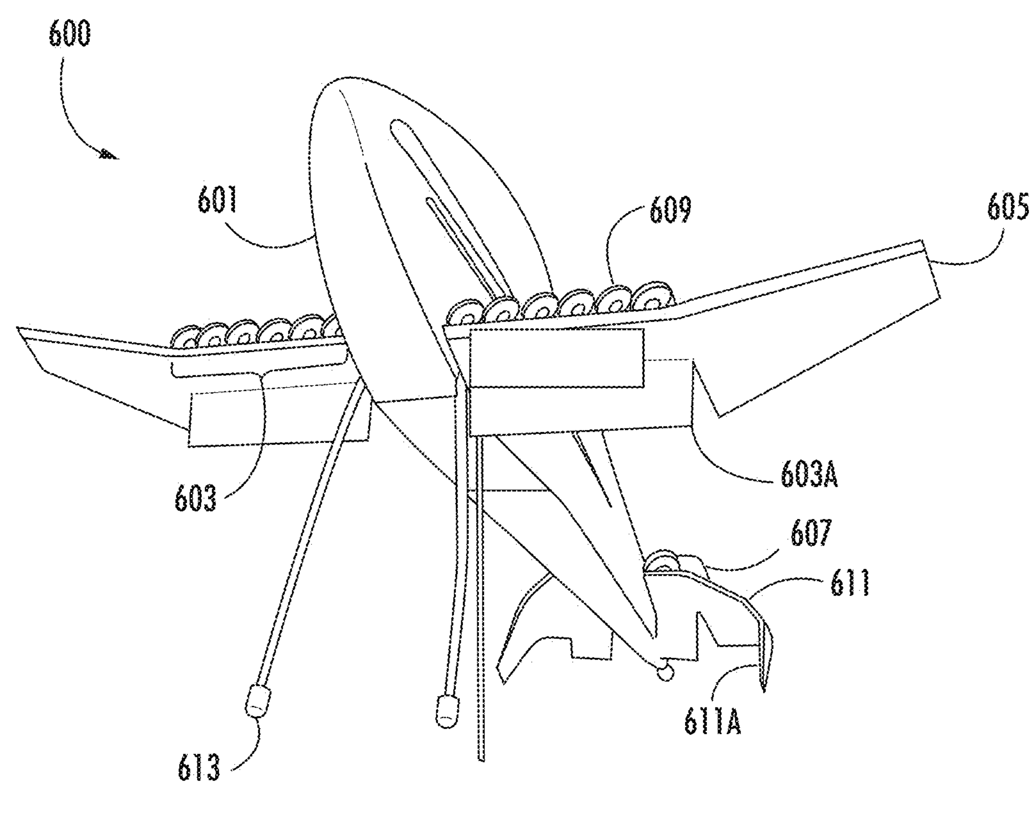
FIGS. 7A and 7B respectively illustrate a front view and a back view of an example aircraft with an integrated array of ducted fans in a landing configuration, each according to one or more example arrangements.
Figure 7B:
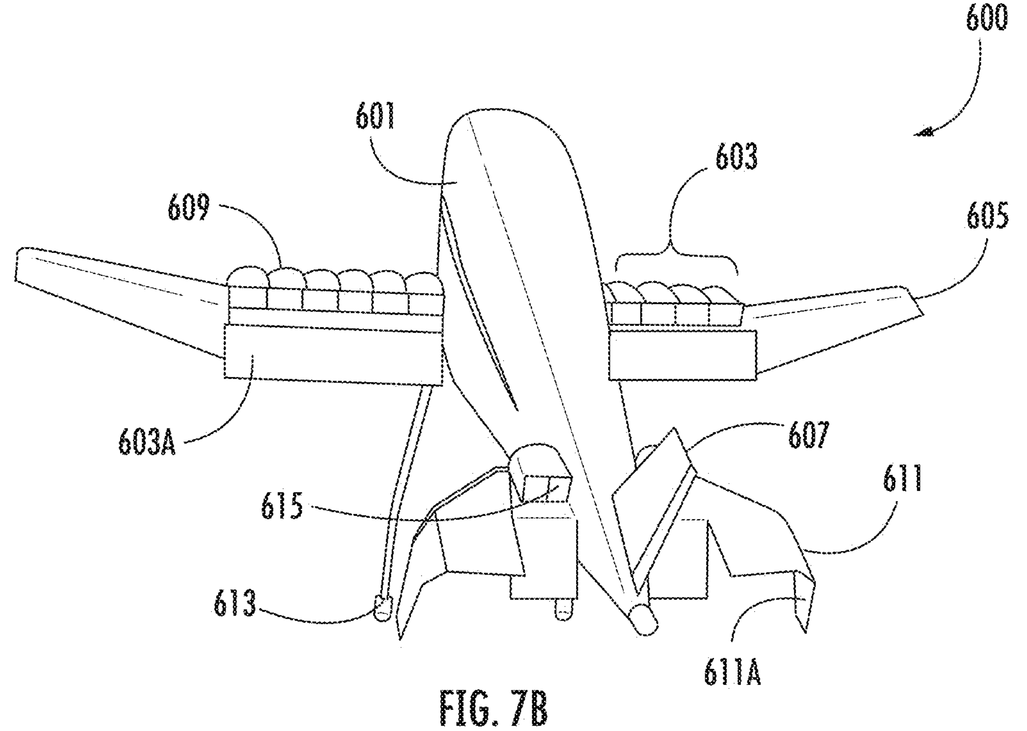

As described herein, FIGS. 6A and 6B respectively illustrate a front view and a back view of an example aircraft with an integrated array of ducted fans in forward flight. FIGS. 7A and 7B respectively illustrate a front view and a back view of an example aircraft with an integrated array of ducted fans in a landing configuration. For example, FIGS. 7A and 7B illustrate a front view and a back view of the aircraft 600. The landing configuration of the aircraft 600 includes the one or more landing mechanisms 613 positioned in a landing configuration providing two points of contacts with the landing surface. In some examples, a portion of the tail end of the fuselage 601 provides an additional point of contact with the landing surface to provide additional stability. The portion of the tail end may comprise additional landing mechanisms 613 (e.g., wheels or the like) to improve ground handling of the aircraft 600. The landing configuration of the aircraft 600 provides access to a bottom portion of the fuselage 601, which may include a cargo bay, a package attachment site, and/or other elements designed to receive and/or hold a payload of the aircraft 600. For example, in the landing configuration illustrated in FIGS. 7A and 7B, the landing mechanisms 613 maintain the fuselage 601 at a pitched angle (e.g., between 30 degrees and 60 degrees, preferably 45 degrees) relative to the landing surface. In some examples, the landing configuration of the aircraft 600 provides a human (or robotic) operator access to the aircraft 600 to load cargo, attach a payload, access internal components of the aircraft 600 (e.g., swap one or more batteries, activate a winch located in a cargo bay, and/or access other internal components) while maintain flight readiness.

Aircraft described herein are capable of multiple flight modes. For example, aircraft 600 is capable of operating in a forward flight mode, a hover mode, a VTOL mode, a CTOL mode, an STOL mode, and/or other modes. The aircraft 600 transitions between flight modes by articulating an articulatable edge of one or more ducted fans 609 to modify the exhaust area of one or more ducted fans 609 and/or modify a direction of flow of the exhaust area to control flow-turning, as described further herein. FIGS. 8A to 8D respectively illustrate a top view, a front view, a bottom view, and a side view of an example aircraft (e.g., aircraft 600) with an integrated array of ducted fans in a hover mode. The aircraft 600 maintains the hover mode by controlling thrust direction by articulating the articulatable edge of one or more ducted fans. For example, the aircraft 600 may articulate a single articulatable edge 603A of an integrated array of ducted fans 603 and/or an articulatable edge of an individual ducted fan 609. In some examples, the aircraft may pitch at an angle to maintain a stable position in the air. For example, aircraft 600 illustrated in FIGS. 8A to 8D may pitch a nose of the fuselage 601 upward at an angle (e.g., between about 30 degrees to about 60 degrees, preferably about 45 degrees) while articulating the articulatable edge of one or more ducted fans 609 or integrated arrays of ducted fans 603 to utilize the Coanda effect (e.g., to allow for thrust vectoring by keeping air propelled by the integrated arrays of ducted fans 603 in close proximity to the surface of the articulatable edge). The aircraft 600 illustrated in FIGS. 8A to 8D thus turns the exhaust area of the one or more ducted fans 609 or integrated arrays of ducted fans 603 by the pitch angle. The aircraft 600 also articulates the articulatable edge 603A of an integrated array of ducted fans 603, and/or articulates an articulatable edge of an individual ducted fan 609 to turn flow such that an optimal angle (e.g., about 90 degrees) between the flow and a surface below the aircraft 600 is achieved. In doing so, the aircraft 600 generates sufficient lift to maintain a hovering position relative to the surface. The aircraft 600 is capable of maintaining hover mode for a predetermined period of time based on a variety of factors including, but not limited to, the total weight of the aircraft 600, the weight of a payload of the aircraft 600, mission parameters, battery charge, a size of a propulsor included in one or more ducted fans 609, and/or other factors. For example, the aircraft 600 may be capable of maintaining hover for a period of two to four minutes, (e.g., about 2.25 minutes).

FIGS. 9A to 9D respectively illustrate a top view, a front view, a rear view, and a side view of an example aircraft with an integrated array of ducted fans in a forward flight mode. The aircraft transitions to forward flight mode from a hover mode, a VTOL mode, a CTOL mode, an STOL mode, and/or from other modes by articulating the articulatable edge of one or more ducted fans 609 or integrated arrays of ducted fans 603 to modify the exhaust area and flow-turning of each ducted fan, producing thrust. For example, as shown in FIGS. 9A to 9D, the articulatable edge of each of the one or more ducted fans 609 and/or an articulatable edge 603A of an integrated array of ducted fans 603 is articulated to produce lift while the ducted fans 609 produce thrust to propel the aircraft 600 in forward flight. In forward flight mode, the aircraft 600 raises, retracts, and/or otherwise moves the landing mechanisms 613 to improve aerodynamics of the aircraft 600 by reducing drag caused by airflow impacting the landing mechanisms 613.

Figure 10:
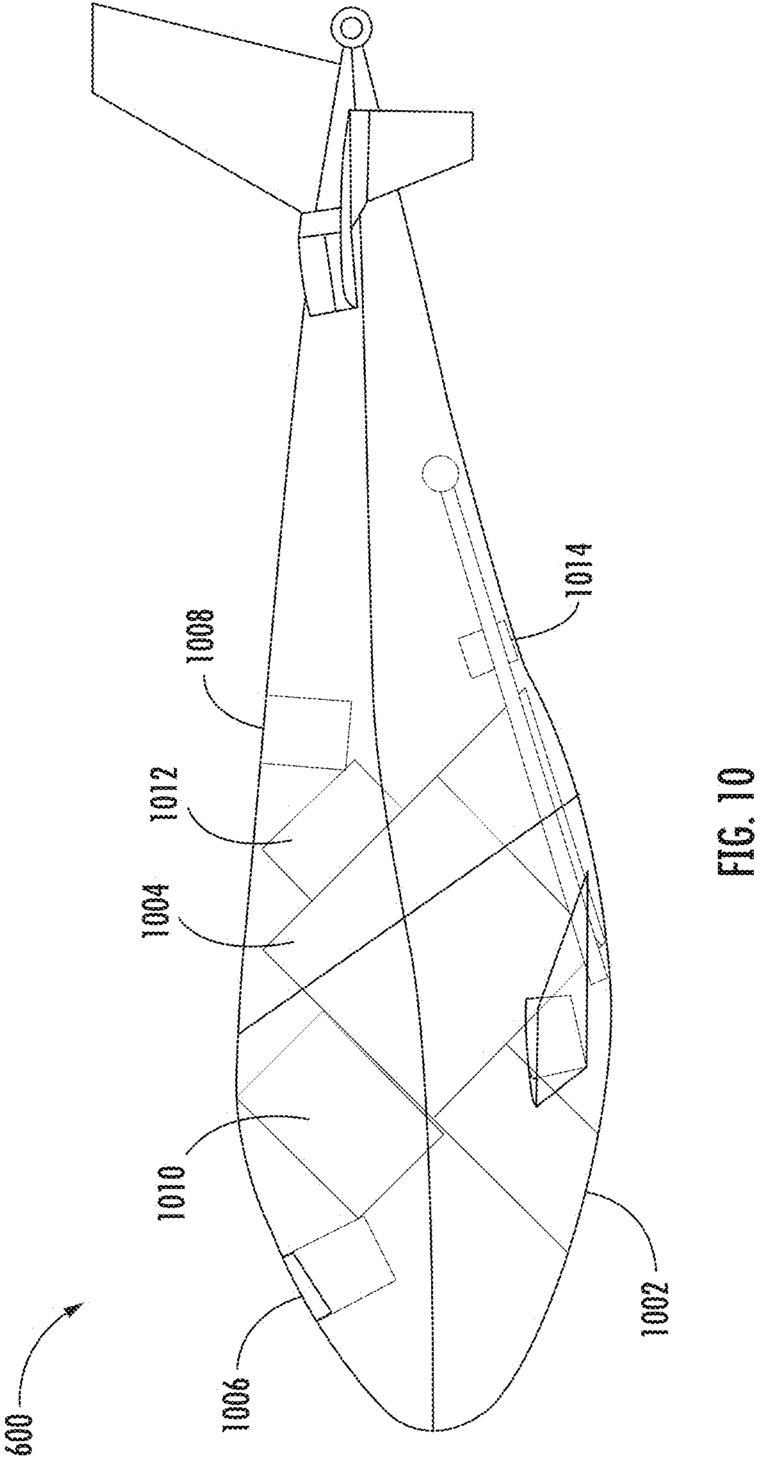
FIG. 10 illustrates a transparent view of internal components of an example aircraft with an integrated array of ducted fans according to one or more example arrangements.

An aircraft as described herein includes a number of internal components that assist with flight, payload delivery, takeoff/landing, and/or other mission parameters of the aircraft. FIG. 10 illustrates a transparent view of internal components of an example aircraft with an integrated array of ducted fans. The aircraft 600 comprises an avionics suite 1002 that provides control over a plurality of elements of the aircraft 600 (e.g., providing reliable global positioning system (GPS)/global navigation satellite system (GNSS) navigation, controlling navigation lighting, enabling main battery swapping while powering other avionic systems, and/or otherwise controlling elements of the aircraft 600). The avionics suite 1002, in some examples, has a weight of two pounds or less.

The avionics suite 1002 is designed to comply with any and all aircraft regulations (e.g., FAA regulations, NDAA regulations, or the like). The avionics suite 1002 comprises a number of interconnected electronic/electrical components. For example, the avionics suite 1002 may comprise a permanent avionics battery, a removable main battery, an autopilot computer, a companion computer, and/or other components or devices. The removable main battery allows for battery swapping while the permanent avionics battery maintains delivery of power to other elements of the avionics suite 1002, such as the autopilot computer and companion computer. In some examples, the removable main battery may be removed via a cargo bay or other opening located on the underside of the fuselage 601. In some examples, the removable main battery may be removed from a top side of the fuselage 601 (e.g., via a hatch or other opening located on the front top or rear top portion of the fuselage 601). The main battery may provide power to one or more propulsion systems (e.g., ducted fans 609, as described herein). The autopilot computer comprises one or more processors, memory, and/or other components configured to control systems such as a GPS, parachute deployment, control surfaces, airspeed sensors, and/or other systems enabling the aircraft 600 to perform autopiloted flight. The companion computer comprises one or more processors, memory, and/or other components configured to control radios, servos, winches, landing mechanisms, cameras, LED controllers, and/or other electronic components of the aircraft 600.

The aircraft 600 may further comprise a number of batteries. For example, the aircraft 600 may comprise a front battery 1006 and/or a rear battery 1008. In some examples, the either of the front battery 1006 or the rear battery 1008 may be a permanent avionics battery, a removable main battery, or the like. In some examples, either of the front battery 1006 or the rear battery 1008 may be installed on a top portion of an interior side of the fuselage 601. The aircraft 600 may further comprise a package 1004. The package may be a box, container, envelope, and/or any other payload of the aircraft 600. As shown in FIG. 10, the package 1004 may be held within the fuselage of the aircraft 600 (e.g., in a cargo hold, or the like). However, it should be understood that in some examples a package 1004 may additionally or alternatively be located on and/or otherwise attached to an outer surface of the aircraft 600 (e.g., as shown in FIG. 11) without departing from the scope of this disclosure.

Figure 11:
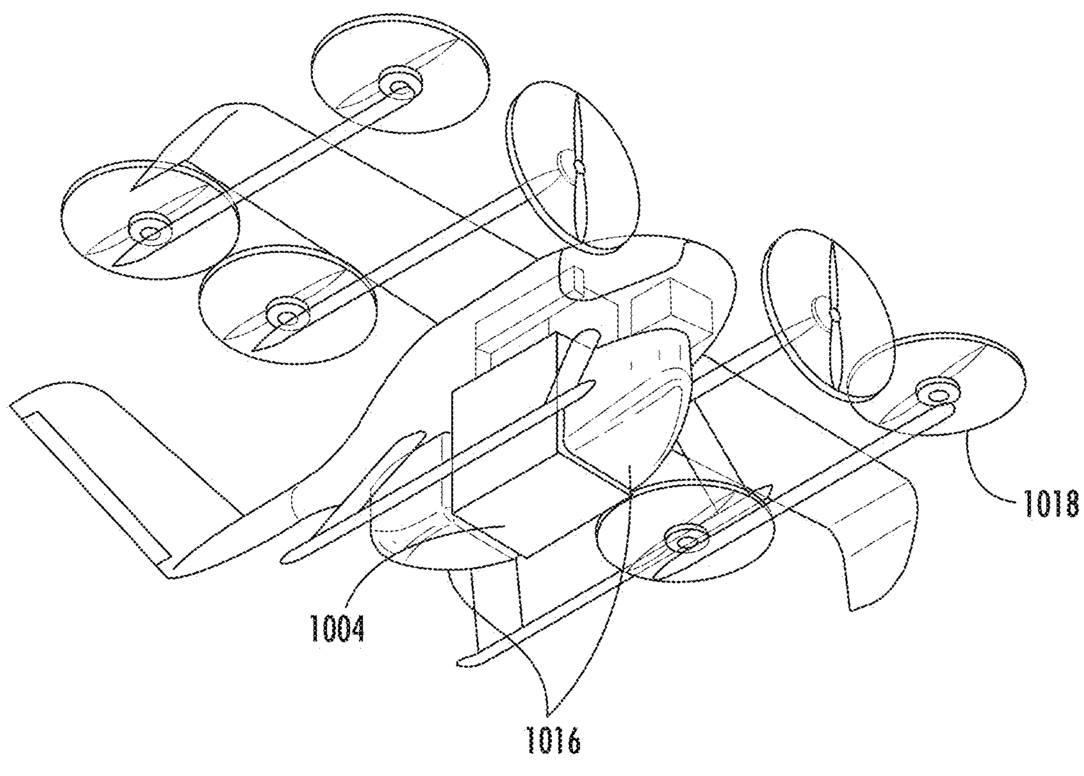
FIG. 11 illustrates an example aircraft utilizing inflatable fairings according to one or more example arrangements.

Referring to FIG. 11, in some examples, the package 1004 may be disposed fully or partially outside of the aircraft. For example, the package 1004 may hang from the fuselage of the aircraft. In some examples, the package 1004 may be connected to one or more inflatable fairings 1016. The inflatable fairings 1016 may comprise cloth and/or other inflatable materials. The aircraft may include one or more fans configured to selectively inflate and deflate (e.g., collapse) the inflatable fairings 1016 (e.g., a respective fan for each one of the inflatable fairings). For example, the inflatable fairings 1016 may be deflated such that they collapse against the fuselage when a package 1004 is not attached to the aircraft, improving aerodynamics. The inflatable fairings 1016 may be inflated to secure and protect the package 1004. It should be understood that, although FIG. 11 depicts the inflatable fairings 1016 attached to an aircraft with one or more rotors 1018, the inflatable fairings may similarly be attached to an aircraft without rotors 1018 (e.g., aircraft 600, as described herein).

Referring again to FIG. 10, the aircraft 600 may comprise a winch 1010. The winch 1010 may be used to load and unload the package 1004. The aircraft 600 may comprise a parachute 1012. The parachute 1012 may be attached to or otherwise integrated with the package 1004. The parachute may be controlled by the avionics suite 1002 to deploy or deliver the package 1004. For example, the avionics suite 1002 may cause the parachute to deploy to safely drop the package 1004 from the aircraft 600. Also or alternatively, a parachute 1012 may be attached to the fuselage of the aircraft 600. For example, the parachute 1012 may be attached to the fuselage such that, when deployed, the parachute supports the weight of the aircraft 600 to allow for safe recovery of the aircraft in an emergency. For example, the avionics suite 1002 may deploy the parachute 1012 when an emergency hampering or preventing flight of the aircraft 600 is detected during a flight or hover mode.

The aircraft 600 may comprise one or more cameras 1014. The cameras 1014 may be integrated with the avionics suite 1002 to provide information relevant to operation of the aircraft 600. The cameras 1014 may be fastened to an outer surface of the aircraft 600 (e.g., the fuselage 601, a terminal end of a main wing assembly 605, a terminal end of an integrated array of ducted fans 603, and/or other outer surfaces of the aircraft 600 as described herein). Also or alternatively, cameras 1014 may be located within the fuselage of the aircraft 600 and positioned to observe an area outside of the aircraft 600. A camera 1014 may be a complementary metal-oxide semiconductor (CMOS) camera, a stereo camera, an artificial intelligence/machine learning camera, and/or other types of camera. The camera 1014 may gather observational information used for guiding precision landing, obstacle avoidance, forward flight visibility, emergency landing zone detection, recognition of package delivery, in-flight navigation, and/or other functions. For example, the camera 1014 may be a CMOS camera used to relay observational information to one or more controllers and guide the aircraft 600 in a precision landing. The camera 1014 may be a stereo camera located on a terminal end of the wing assembly 605 and configured to provide observational information to a pilot or controller of the aircraft 600 in order to assist with object avoidance/detection, forward flight visibility, and/or detection of an emergency landing zone. The camera 1014 may be comprise an integrated artificial intelligence/machine learning model trained to verify successful package delivery. For example, the model may be trained to identify, based on observational information provided by the camera, whether a package 1004 was delivered to a target area, address, person, or the like. In some examples, the camera 1014 may compress and stream video or images to deliver the observational information to the avionics suite 1002, a remote observation post, and/or other destinations.

As described herein, an aircraft may comprise a jetfoil (e.g., an integrated array of ducted fans). As shown by way of example in FIGS. 12-16, the aircraft includes at least one flap with an articulatable edge that can be articulated to modify a respective exhaust area of each ducted fan included in the integrated array (e.g., resulting in increasing or decreasing air flow) and simultaneously or near-simultaneously direct air flow by controlling flow-turning, such as by using the Coanda effect. For example, the articulatable edge may be articulated to selectively control flow turning and deflect air flow from a propulsor of a ducted fan or an array of ducted fans by as much as 75 degrees in some embodiments. The articulatable edge may control flow turning by modifying an angle of air flow from the propulsor turned, via the Coanda effect, over the articulatable edge. For example, an articulatable edge (e.g., a flap) may be controlled (e.g., via a control signal) by changing the position and/or orientation of the articulatable edge such that a sheet of air propelled by the propulsor is kept in close proximity to the surface of the articulatable edge (e.g., via the Coanda effect) to allow for flow turning at a desired angle over the articulatable edge. An articulatable edge, in some examples, may extend along an entire length of the integrated array of ducted fans. In these examples, a respective portion of the articulatable edge corresponds to one of the ducted fans of the integrated array. In some examples, an aircraft may include multiple articulatable edges, for example, one articulatable edge for each ducted fan of the integrated array. In these examples, the respective articulatable edge may extend across the length of its respective ducted fan. In these examples, the articulatable edge of an individual ducted fan may be independently articulated to modify the individual exhaust area and control the flow turning of the individual air flow generated (e.g., propelled) by the ducted fan and/or may be collectively articulated to modify the collective exhaust area of the integrated array of ducted fans and control the flow turning of the collective air flow generated by the integrated array.

Figure 12:
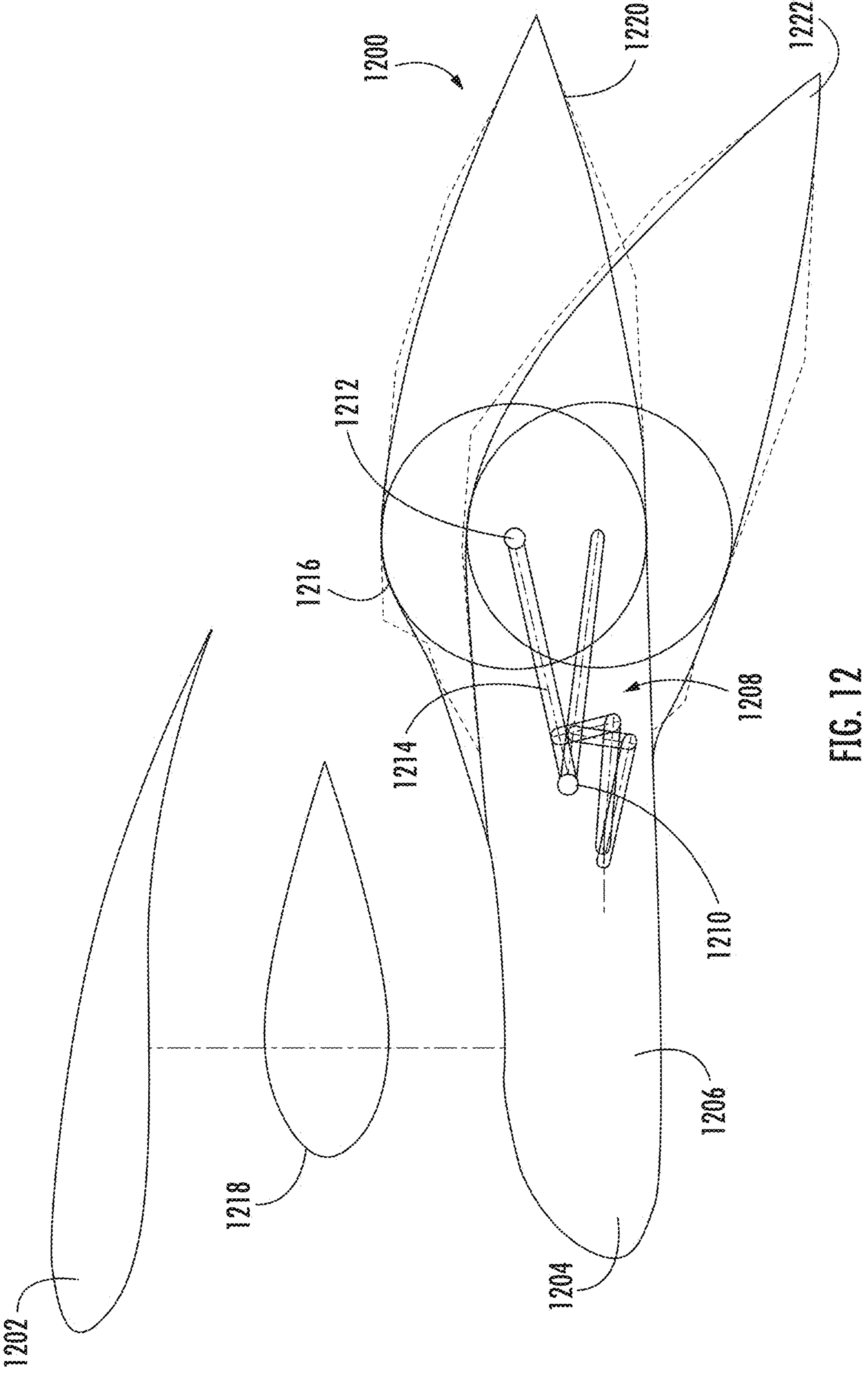
FIG. 12 is a diagram of a side cross-sectional view of an example jetfoil illustrating an example of a first articulated position of the jetfoil and an example of a second articulated position of the jetfoil according to one or more example arrangements.

FIGS. 12-16 show cross-sectional side views of an example jetfoil (e.g., comprising an integrated array of ducted fans) with an articulatable edge 1200 that may be used in certain implementations. Referring to FIG. 12, the articulatable edge 1200 may be connected at the trailing edge of a ducted fan comprising an upper element (e.g., an airfoil) with a surface portion 1202, a lower element (e.g., an airfoil) with a surface portion 1204, a control assembly 1208, and a propulsor 1218. The articulatable edge 1200 may be and/or include a portion of a single articulatable edge of an integrated array of ducted fans as described herein. In some examples, the articulatable edge 1200 may include a linkage (e.g., a number of connected bars, hinges, and/or other mechanical components) configured to secure the articulatable edge 1200 to the surface portion 1204. The linkage may be included in the control assembly 1208. The linkage may facilitate articulation the articulatable edge 1200, as described further herein. In some examples, the articulatable edge 1200 may include features that allow it to fail in place or fail safely. For example, the articulatable edge 1200 may include a number of redundant linkages to reduce the risk of a single point of failure disabling the ducted fan and/or the aircraft.

The propulsor 1218 may be or comprise an electric bladed fan. For example, propulsor 1218 may comprise an electrically-powered bladed disk configured to generate thrust. The bladed disk may, in some examples, have a diameter less than three inches. The propulsor 1218 may be characterized by BPF at or near an ultrasonic frequency. In some examples, the propulsor 1218 may have a diameter of three inches or less, providing reduced noise during operation of the aircraft. In some examples, the propulsor 1218 may be constructed from a material that is flexible with appropriate stiffness to accommodate an aerodynamic shape for the forward flight mode, the hover mode, VTOL mode, CTOL mode, STOL mode, and/or other modes of operation of an aircraft as described herein. The propulsor 1218 may be positioned in a duct of the ducted fan (e.g., between the surface portion 1202 of the upper element and the surface portion 1204 of the lower element). The propulsor 1218 may define, rearward (aft) from the nose of the propulsor 1218, an exhaust area where airflow from the propulsor 1218 contacts the surface portion 1202 and/or the surface portion 1204. The surface portion 1202 of the upper element has a curvature designed to produce an aerodynamic lift force (e.g., in a forward flight mode) and facilitate control of flow turning. The surface portion 1202 may protrude slightly ahead of a leading edge 1206 of the lower element to aid in inflow conditions throughout transition between flight modes (e.g., forward flight, VTOL, and/or other modes). The surface portion 1204 of the lower element has a curvature designed to produce aerodynamic lift force (e.g., in a forward flight mode) and control the area distribution of air flow downstream of the propulsor 1218. The surface portion 1204 comprises the articulatable edge 1200 and the leading edge 1206. The articulatable edge 1200 may be, for example, a flap exposed to an exterior environment and configured to contribute to the aerodynamic lift force (e.g., in a forward flight mode) and provide control of flow turning (e.g., in a VTOL mode). The leading edge 1206 is fixed in a stationary position relative to the articulatable edge 1200 and may be positioned within a duct of the ducted fan. The leading edge 1206 may facilitate control of the area distribution of air flow downstream.

The control assembly 1208 is configured to cause articulation of the articulatable edge 1200. In some examples, the articulatable edge 1200 of a single ducted fan may be a portion of a single articulatable edge of an integrated array of ducted fans. In these examples, the control assembly 1208 may control articulation of the articulatable edge 1200 by articulating the single articulatable edge of an integrated array of ducted fans, causing articulation of the respective articulatable edges 1200 of each ducted fan in the array. The control assembly 1208 may include a communication interface, receiver, or the like configured to receive (e.g., from a remote drone control device, from an avionics suite, from a cockpit control device, and/or from other sources) control signals (e.g., electrical signals, electromechanical signals, or the like) directing the control assembly to articulate the articulatable edge. The control assembly 1208 may articulate the articulatable edge 1200 to modify (e.g., change, vary, reduce, increase, and/or otherwise modify) a cross-sectional exhaust area of the propulsor 1218. The control assembly 1208, by articulating the articulatable edge 1200, also causes modification of the flow turning (e.g., by directing the flow of air caused by the ducted fan). For example, articulating the articulatable edge 1200 allows the ducted fan to utilize the Coanda effect, which keeps air flow in close proximity to the surface portion 1204 of the lower element, to turn the flow of air over the articulatable edge 1200 (e.g., over an edge of the flap). In some examples, the control assembly 1208 may control flow turning of air flow of an entire integrated array of ducted fans by articulating the single articulatable edge of the integrated array, thereby articulating the respective articulatable edges 1200 of each ducted fan in the integrated array.

As described in further detail below, the control assembly 1208 links modification of the cross-sectional exhaust area of the propulsor 1218 with modification of flow turning (e.g., by modifying a direction of airflow produced by the propulsor 1218 and/or by the ducted fan). By articulating the articulatable edge 1200, the control assembly 1208 simultaneously provides the modification of the cross-sectional exhaust area and the control over the flow turning described herein in a single movement or operation of the articulatable edge 1200. Thus, the use of the articulatable edge 1200 reduces design complexity, reduces a number of possible points of failure in aircraft design, and allows the ducted fan to operate at its peak efficiency over various operating conditions by combining actuation of the articulatable edge 1200 for flow turning control with modification of the exhaust area of the propulsor 1218. Additionally, the use of the articulatable edge 1200 provides efficient transition of the aircraft between flight modes (e.g., forward flight, VTOL, CTOL, STOL, hover mode, and/or other modes). For example, the control assembly 1208 may articulate the articulatable edge 1200 between a first position for causing forward flight of the aircraft and a second position for causing vertical liftoff (e.g., in a VTOL mode) of the aircraft. For example, the control assembly 1208 may articulate the articulatable edge 1200 to cause simultaneous modification of the exhaust area and of the flow turning of an integrated array of ducted fans and/or an individual ducted fan. The articulation may cause the integrated array of ducted fans and/or the individual ducted fan to transition between providing forward thrust and providing vertical lift relative to the ground based on the size of the exhaust area and the angle of the flow turning. Integrating the ducted fan with articulatable edge 1200 into an array of similar ducted fans as described herein allows for control of flow turning over a majority (e.g., 80% or more) of the upper surface of a wing of the aircraft, which reduces drag penalties and allows for extended flight durations and improved control of the aircraft during flight.

It should be understood that the first and second positions described above are merely examples and that the articulatable edge 1200 may be articulated to occupy additional or alternative positions. For example, the articulatable edge 1200 may be articulated to control flow turning (e.g., by deflecting exhaust flow) to achieve an optimal angle, such as the difference between a pitch angle of the aircraft and a vertical axis (e.g., for a VTOL mode), to partially deflect exhaust flow for a STOL mode, and/or to enable a CTOL mode by providing minimal or no articulation of the articulatable edge 1200 relative to a horizontal of the ducted fan. Articulation of the articulatable edge 1200 as described herein provides additional benefits over conventional wing-borne aircraft because no mechanical change of the pitch of rotor blades is required. Accordingly, the risk of exceeding desired noise levels is reduced or eliminated by utilization of the methods described herein. Additionally, by providing exhaust area and flow-turning control using a single articulatable edge 1200, the need for multiple different actuators in systems that utilize a number of articulatable edges is eliminated. Accordingly, the jetfoil comprising an array of integrated ducted fans with a single articulatable edge as depicted in FIGS. 12 to 16 provides savings in construction costs and reduces the weight of the aircraft, extending a maximum achievable flight duration and/or increasing the maximum payload weight that might be carried by the aircraft.

In some examples, the control assembly 1208 may comprise components configured to pivot the articulatable edge 1200 about a number of pivot points. For example, the control assembly 1208 may comprise a bar configured to pivot the articulatable edge 1200 of an integrated array of ducted fans and/or of a ducted fan relative to at least one pivot point, at least one actuator configured to drive the bar, and a linkage assembly connecting the articulatable edge to a fixed position (e.g., the leading edge 1206). For example, the control assembly 1208 may include pivot points 1210 and 1212 and a bar 1214. The pivot points 1210 and 1212 and bar 1214 may together, with one or more connecting elements (e.g., hinges, mechanical arms, bars, or the like), form the linkage assembly linking the articulatable edge 1200 to the leading edge 1206 of the lower element. The control assembly 1208 may comprise one or more additional internal components (e.g., electronics, motors and/or other actuators, or the like) configured to articulate the articulatable edge 1200 as described herein.

In operation, the control assembly 1208 may move (e.g., translate) the bar 1214, causing the articulatable edge 1200 to rotate about a flap-arc translation pivot point 1210, which may cause an arc 1216 of the articulatable edge 1200 to move toward or away from a center of the exhaust area of the propulsor 1218. By moving the arc 1216 of the articulatable edge 1200 the control assembly 1208 may modify the exhaust area. For example, moving the arc 1216 toward and/or into the center of the exhaust area (e.g., to a first position 1220) may decrease a cross-sectional area of the exhaust area and/or otherwise changes a shape of the cross-sectional area. Similarly, moving the arc 1216 downward away from, and/or extending away from, the center of the exhaust area (e.g., to a second position 1222) may increase a cross-sectional area of the exhaust area and/or otherwise change a shape of the cross-sectional area. The two positions 1220 and 1222 depicted in FIG. 12 may be the maximum (extreme) positions of the articulatable edge 1200. The bar 1214 may be moved (e.g., translated) about a pivot point 1210 in a first direction to cause the arc 1216 to decrease the cross-sectional area of the exhaust area and the bar 1214 may be moved (e.g., translated) about the pivot point 1210 in a second direction to cause the arc 1216 to increase the cross-sectional area of the exhaust area. Thus, pivot point 1210 may be referred to as a flap-arc translation pivot point (e.g., as seen in FIG. 12). Pivot point 1210 may be located at the center of a cross-sectional area of the root of the articulatable edge 1200 (e.g., the location where the articulatable edge 1200 meets the leading edge 1206). The arc 1216 of the articulatable edge 1200, in this example, is defined via the contour of the articulatable edge 1200. As seen in FIG. 12 and moving between a first position 1220 and a second position 1222, the articulatable edge 1200, in first position 1220, tapers upward near the exhaust area of the propulsor 1218 until it reaches a peak of the arc 1216, at the exhaust area, at which point the articulatable edge 1200 tapers downward toward the end of the articulatable edge 1200. Put differently, the top-to-bottom thickness (diameter) of the articulatable edge 1200 may increase from a position preceding the exhaust area of the propulsor 1218 to the peak of the arc 1216 where the thickness (diameter) of the articulatable edge 1200 is maximal and then decrease from the peak of the arc to the end of the articulatable edge 1200 (e.g., as shown in first position 1220). As described herein, moving the articulatable edge 1200 may position the peak of the arc 1216 within (or closer to) the exhaust area of the propulsor 1218 (e.g., a center of the exhaust area) or outside (or further from) the exhaust area thereby modifying the exhaust area by changing its shape and/or dimensions.

In some examples, using the control assembly 1208 to articulate the articulatable edge 1200 achieves one or more additional effects. For example, in addition to modifying the cross-sectional area of the exhaust area, articulating the articulatable edge 1200 also controls flow turning as described herein (e.g., by modifying the angle at which air flow from the propulsor 1218 turns over the articulatable edge 1200). Controlling a single articulatable edge 1200 of a ducted fan or of an integrated array of ducted fans as described herein thus beneficially provides the dual effects of controlling the cross-sectional area of the exhaust area and of controlling flow turning via a single operation. For example, by articulating the single articulatable edge 1200 of an array of integrated ducted fans to move from a first position to a second position, simultaneous modification of the cross-sectional area of the exhaust area and control over the flow turning provided by the integrated array of ducted fans is achieved. The features described herein thus provide a high level of control over the flight of an aircraft while minimizing the number of components (and associated risks and costs) required to achieve that level of control.

Figure 13:
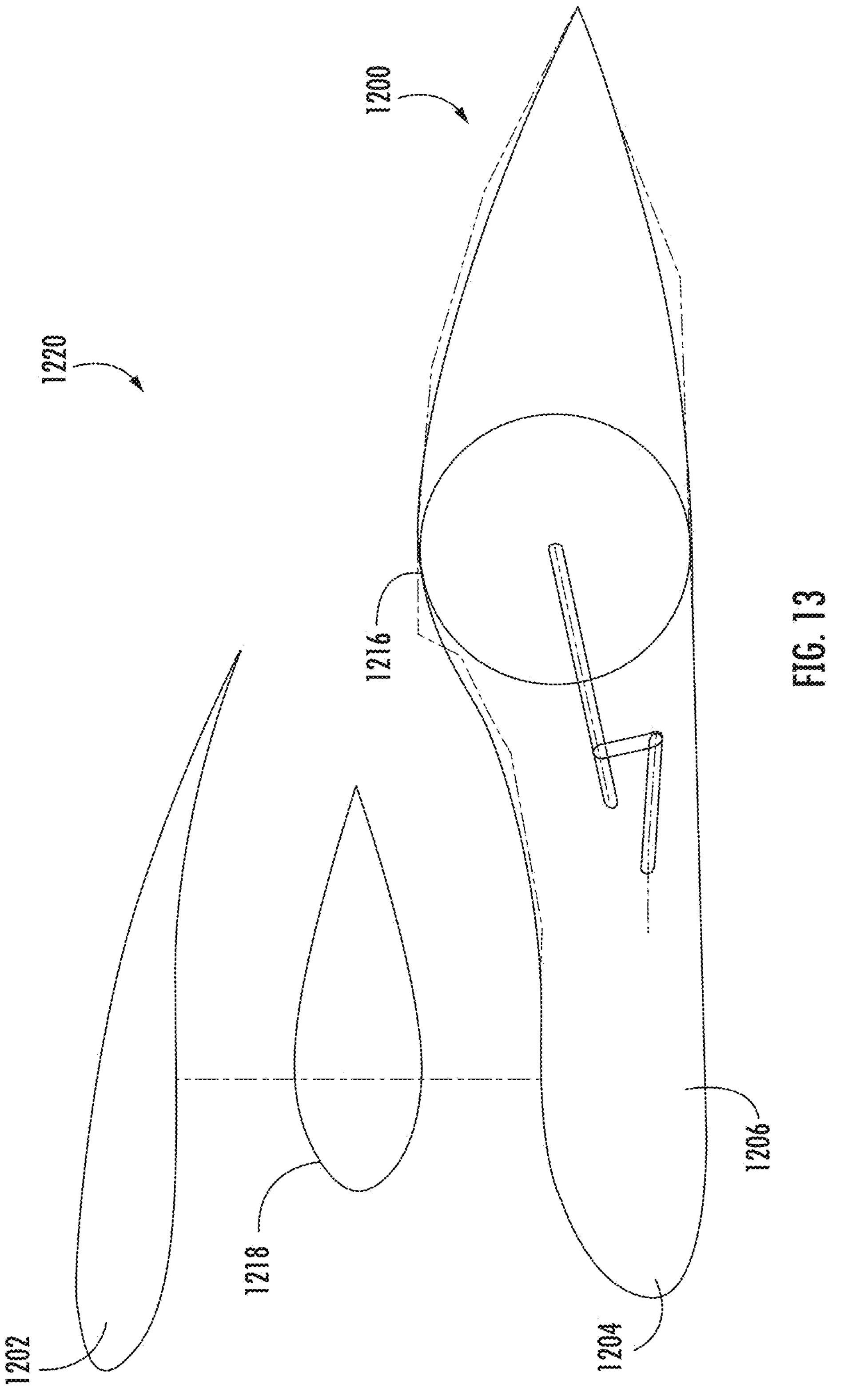
FIG. 13 is a diagram of a side cross-sectional view of a ducted fan illustrating an example of an articulated position of the jetfoil flap according to one or more example arrangements.

FIG. 13 is a diagram of a side cross-sectional view of a ducted fan illustrating an example of an articulated position of the jetfoil flap. First position 1220, as depicted in FIG. 13, may be used for a forward flight mode of operation. A first position may be one of a plurality of different positions that may be utilized. In one embodiment, the illustrated first position may represent a cruise position, whereas a second position, such as the position depicted in FIG. 14, may represent a hover position. Returning to FIG. 13, the first position 1220 may be achieved by sending a control signal to the control assembly of the ducted fan, and/or of an integrated array of ducted fans including the ducted fan, instructing the articulatable edge 1200 to decrease a cross-sectional area of the exhaust area. The first position 1220 of the articulatable edge 1200 of the jetfoil flap may decrease a cross-sectional area of the exhaust area by moving the arc 1216 of the articulatable edge 1200 upwardly into, or toward, the exhaust area, thereby changing the shape and dimensions of the exhaust area. The first position 1220 of the articulatable edge 1200 may reduce flow turning (e.g., to increase a speed of the aircraft and provide forward thrust) by decreasing a turning of the air flow over, or around, the articulatable edge 1200.

Figure 14:
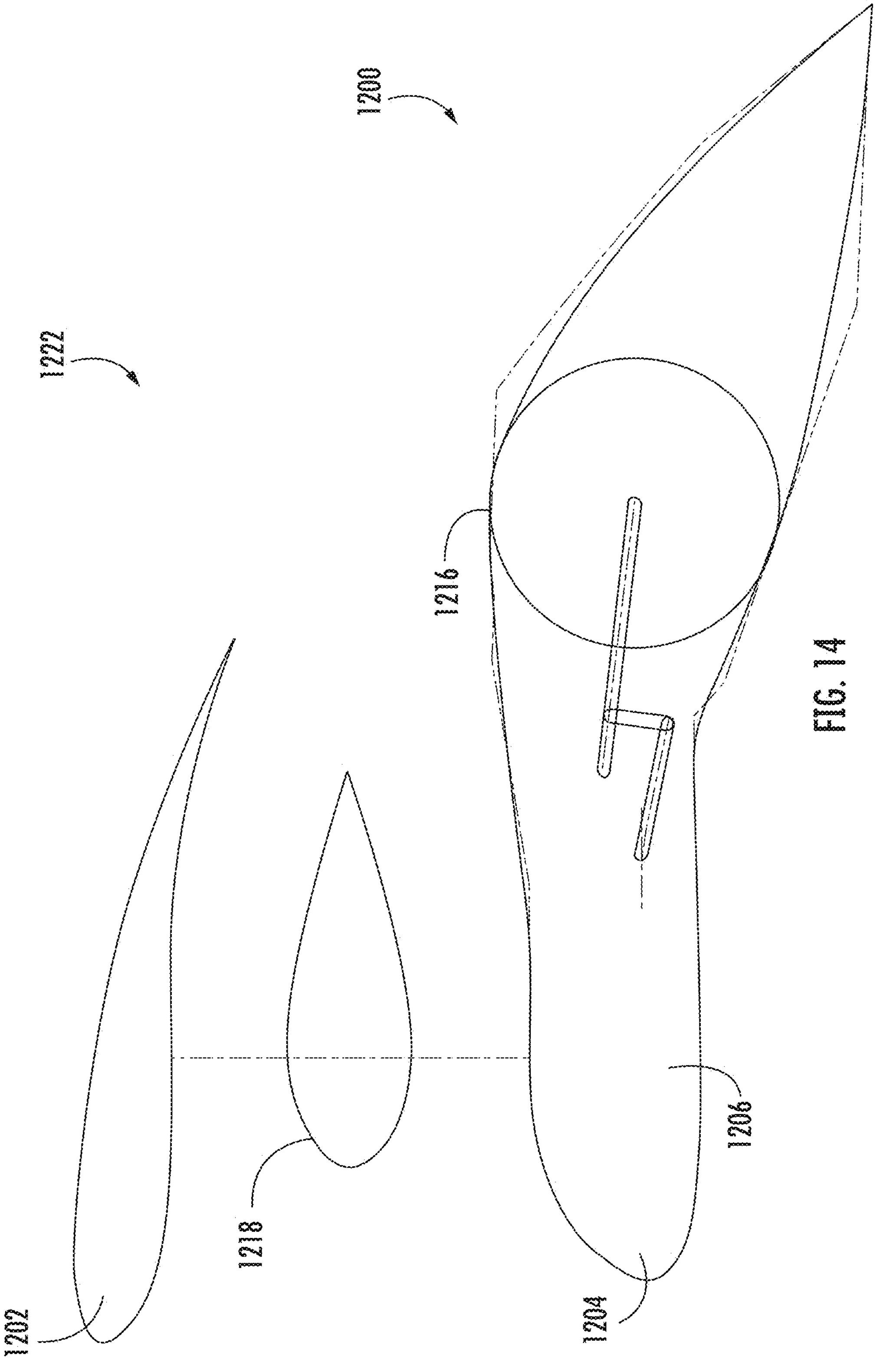
FIG. 14 is a diagram of a side cross-sectional view of a ducted fan illustrating an example of an articulated position of the jetfoil flap according to one or more example arrangements.

FIG. 14 is a diagram of a side cross-sectional view of a ducted fan illustrating an example of an articulated position of the jetfoil flap. Second position 1222, as depicted in FIG. 14, may be used for a hover mode of operation. The second position 1222 may be achieved by sending a control signal to the control assembly for controlling the jetfoil flap, instructing the articulatable edge 1200 to increase a cross-sectional area of the exhaust area. The second position 1222 may increase a cross-sectional area of the exhaust area by moving the arc 1216 of the articulatable edge 1200 downwardly away from, or extending away from, the exhaust area, thereby changing the shape and dimensions of the exhaust area. The second position 1222 may increase flow turning over, or around, the articulatable edge 1200 to provide thrust vectoring (e.g., such that vertical lift is provided to an aircraft to maintain a hovering position). For example, as described herein, the articulatable edge 1200 may be moved (e.g., based on a control signal) to the second position 1222 such that the Coanda effect keeps air flow propelled by the propulsor 1218 in close proximity (e.g., within a predetermined threshold/target distance) to the surface of the articulatable edge 1200 and turns the air flow at a desired angle corresponding to second position 1222. Thus, movement of the articulatable edge 1200 allows for control of the direction and/or angle of thrust.

Figure 15:
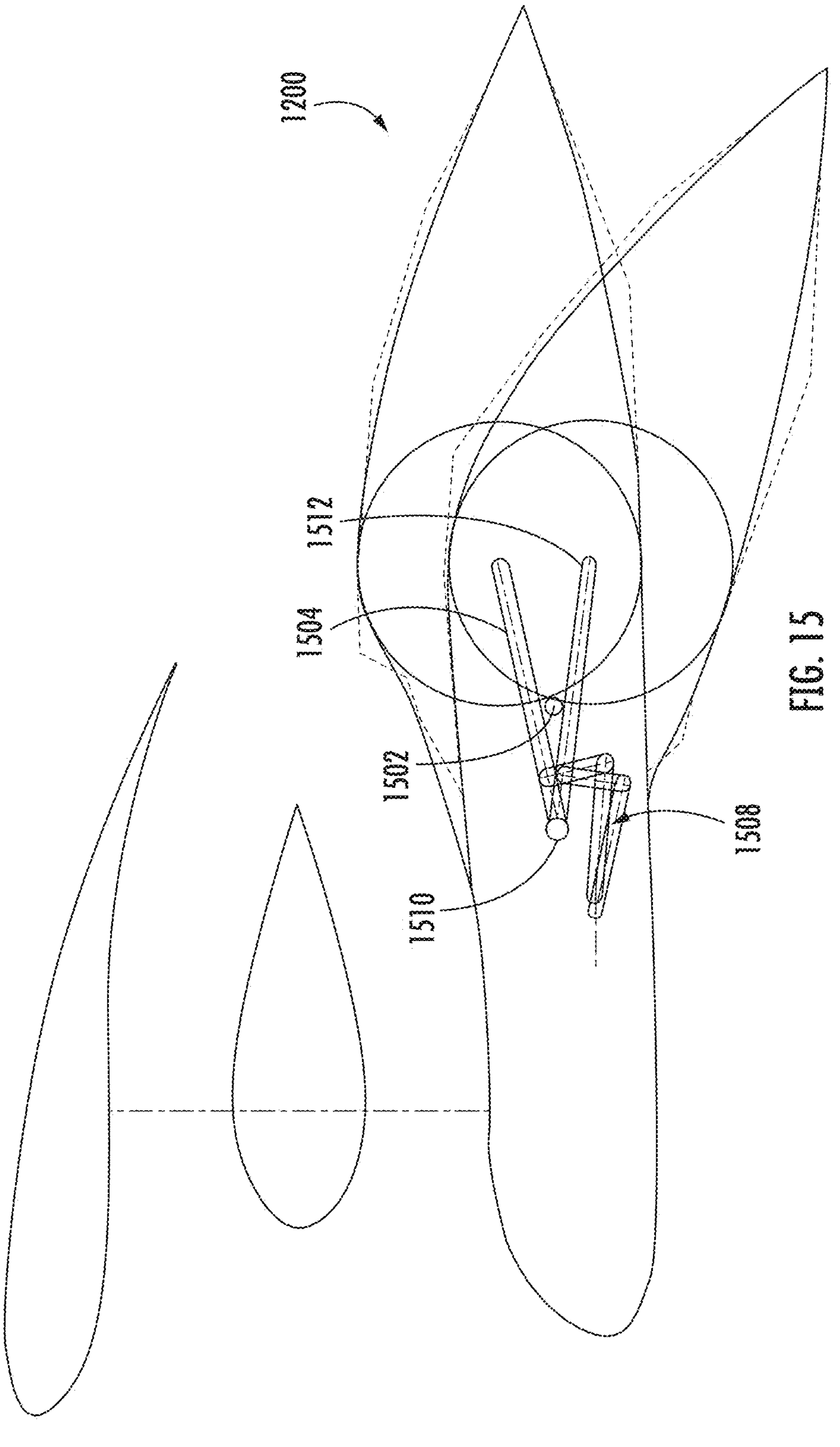
FIG. 15 is a diagram of a side cross-sectional view of a ducted fan illustrating an example of a first articulated position of the jetfoil flap and an example of a second articulated position of the jetfoil flap according to one or more example arrangements.

It should be understood that additional or alternative configurations of the control assembly 1208 are included within the scope of this disclosure. For example, an alternative configuration of control assembly 1208 corresponds to FIG. 15. FIG. 15 is a diagram of a side cross-sectional view of a ducted fan illustrating an example of a first articulated position of the jetfoil flap and an example of a second articulated position of the jetfoil flap. In FIG. 15, the articulatable edge 1200 (e.g., as described in FIGS. 12 to 14) is controlled by a control assembly 1508 comprising a pin 1502 and an actuator bar 1504. The pin 1502 defines a rotation point for a circular cross section of the root of the articulatable edge 1500. Rotation of an angle of the articulatable edge 1200 is thus controlled by the pin 1502 constraining the motion of the articulatable edge 1200 during movement of the actuator bar 1504. The actuator bar 1504 is moved by one or more components (e.g., motors, or the like) of the control assembly 1508. During movement of the actuator bar 1504, the pin 1502 constrains movement of the articulatable edge 1200 such that when the actuator bar 1504 is moved to translate the articulatable edge 1200 about pivot point 1510, the articulatable edge 1200 also rotates about pivot point 1512 to achieve a desired position of the articulatable edge 1200. The pin 1502 thus couples the arc translation and flap angle rotation described with respect to FIG. 12 into a single element. However, in some examples, a second actuator may be used to control the flap angle separate from the arc translation.

Figure 16:
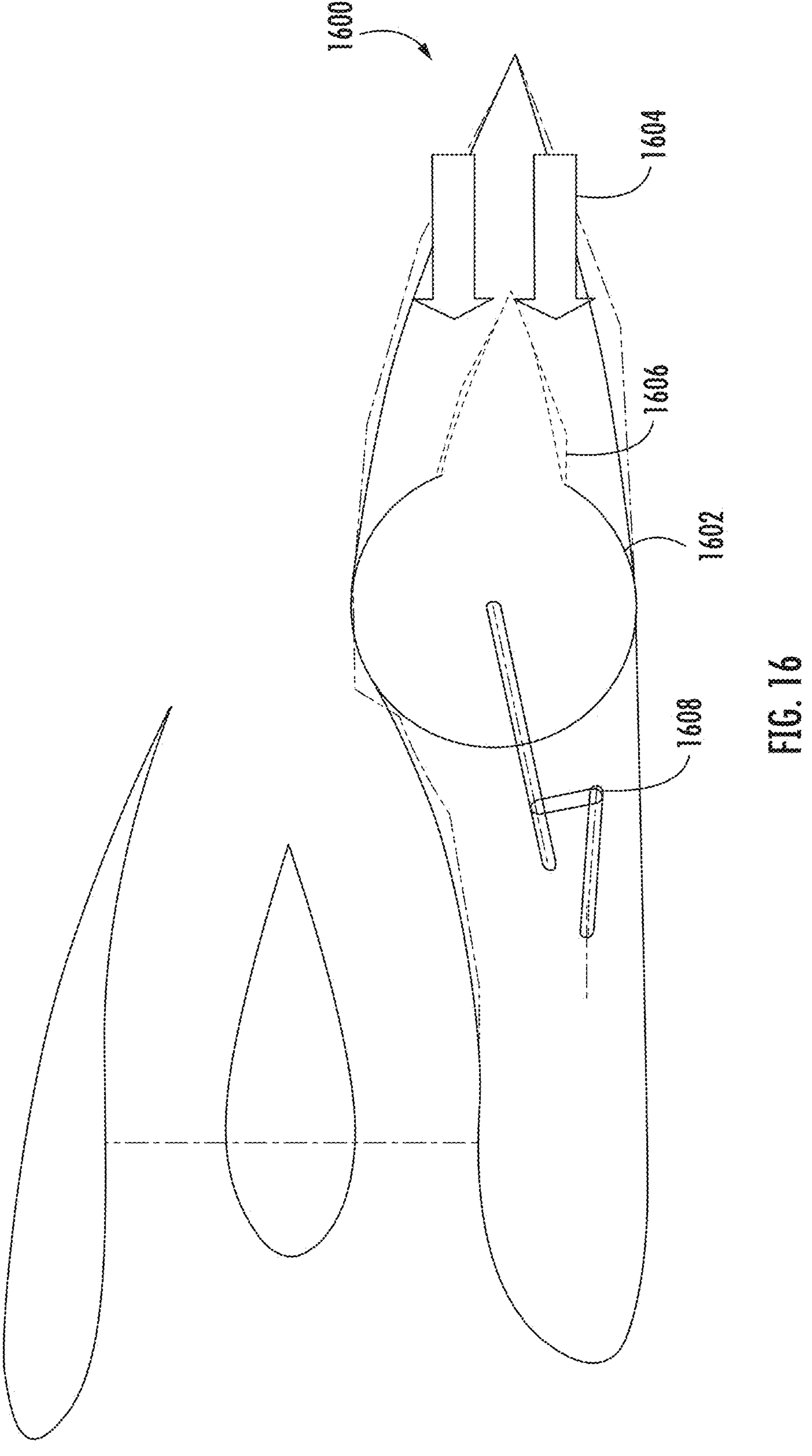
FIG. 16 is a diagram of a side cross-sectional view of a ducted fan illustrating an example of a first articulated position of the jetfoil flap and an example of a second articulated position of the jetfoil flap according to one or more example arrangements.

In another example, a control assembly may comprise components designed to retract and extend a movable edge as an alternative or as an addition to pivoting a movable trailing edge about one or more pivot points. FIG. 16 provides an example of a movable edge 1600 that is configured to both articulate as well as extend and retract. FIG. 16 is a diagram of a side cross-sectional view of a ducted fan illustrating an example of a first articulated position of the jetfoil flap and an example of a second articulated position of the jetfoil flap. Referring the FIG. 16, a control assembly 1608 may include a single actuator component (e.g., a motor, or the like) for extending and retracting the movable edge 1600. A retraction element 1602 is positioned at a terminal end of the movable edge 1600. The retraction element 1602 may be or comprise a portion of the jetfoil with an opening, inlet, or the like configured to receive the movable edge 1600 as the movable edge retracts. Though FIG. 16 depicts the retraction element 1602 within a circular region it should be understood that the retraction element 1602 may have any shape or configuration capable of receiving the movable edge 1600 as the movable edge retracts without departing from the scope of this disclosure. Additionally, it should be understood that in examples where the movable edge 1600 of the jetfoil flap is a portion of a single movable edge of an integrated array of ducted fans, the retraction element 1602 may extend, cover, and/or otherwise span a length of the single movable edge of the integrated array of ducted fans. In these examples, the entirety of the single movable edge of the integrated array of ducted fans may be retracted into, and/or extend out from, the retraction element 1602 in a single operation.

In operation, the control assembly 1608 may cause an extended movable edge 1600 to retract into the retraction element 1602 in the direction of arrows 1604 to a retracted position 1606. The retracted position 1606 may be located at any position between a maximum (extreme) extendable position of the movable edge 1600 and a minimum extendable position of the movable edge 1600. For example, as shown in FIG. 16, the retracted position 1606 may leave a trailing portion of the movable edge 1600 extended such that flow turning is directed over the terminal end of movable edge 1600. It should be understood that the movable edge 1600 may be retracted in a horizontal direction (e.g., at an angle of 180 degrees) as depicted by arrows 1604, yet in some examples the movable edge 1600 may be retracted at an angle other than 180 degrees. Use of the control assembly 1608 to retract/extend the movable edge 1600 achieves all the same benefits of articulating the movable edge 1600 as described herein but without the need for additional actuator components (e.g., a translatable bar, a motor, and/or other actuator components). Thus, a control assembly 1608 configured to retract and extend the movable edge 1600 may further reduce or eliminate additional actuator weight in the aircraft, further extending a maximum achievable flight duration of the aircraft and reducing construction costs.

Aircraft implementing one or more of the features described herein may be optimized for a variety of mission parameters such as maximum noise, flight distance, flight duration, payload weight, payload size, delivery time, aircraft weight, maximum speed, and/or other parameters. Aircraft implementing one or more of the features described herein also improve over conventional designs (e.g., open rotor drones, and/or other designs). In some examples, an aircraft as described herein is configured to travel at a speed in the range of about 200-400 miles per hour (mph) (e.g., at least 200 mph, 300 mph, or 400 mph). In other examples, an aircraft as described herein is configured to travel at lower speeds, for example, in the range of about 50-80 mph (e.g., 75 mph). The aircraft may be configured for different flight speeds to optimize flight speed for a specific mission. For example, the aircraft may be a drone configured to travel at 75 mph to optimize the aircraft for package delivery. Accordingly, the aircraft as described herein offers improvements over conventional open rotor drone designs, which may not achieve cruise speeds over 56 mph. The improvements in cruise speed offered by the features described herein provide additional benefits, such as reducing a mission duration (e.g., allowing for reduced package delivery times). For example, for a 40-mile round trip mission, conventional open rotor designs for aircraft may require about 42.5 minutes, but aircraft implementing features described herein have been shown to complete a 40-mile round trip mission, in the same conditions, in about 32 minutes. Also or alternatively, the aircraft may be configured to optimize a maximum descent velocity. For example, using the features described herein, an aircraft (e.g., a drone) may achieve a maximum descent velocity of about 2,050 feet per minute, improving over conventional open rotor designs that achieve a maximum descent velocity of about 738 feet per minute. In some examples, aircraft implementing one or more features described herein achieve the improvements over open rotor designs, as described herein, by improving a lift-to-drag ratio of the aircraft. For example, by implementing the features described herein to optimize the aircraft for efficient exhaust area and flow turning control, aircraft may achieve a lift-to-drag ratio of 12.2. This offers improvement over, for example, conventional open rotor designs which are known to have a maximum lift-to-drag ratio of about 7.4.

In certain embodiments, the aircraft may be optimized for a hover time per flight. For example, the number of ducted fans may be increased or decreased to increase or decrease a maximum hover time per flight. In some examples, the aircraft may be a drone configured to hover for a duration in the range of about 2-3 minutes (e.g., about 2.25 minutes), which may optimize the aircraft for package delivery. Aircraft that can complete a mission (e.g., a flight, a delivery, or the like) with a nominal hover duration in the range of 2-3 minutes (e.g., about 2.25 minutes) improve over conventional open rotor designs that have a nominal hover time exceeding 3 minutes (e.g., 3.25 minutes) by reducing total mission time and improving power and/or fuel efficiency.

In certain embodiments, the aircraft may be optimized for total weight. In one embodiment, the vehicle may weigh about 3,000-4,000 lbm (pound mass), 4,000-5,000 lbm, or 3,500-4,000 lbm, in other embodiments in may weigh 4,500-5,500 lbm, in yet further embodiments it may weigh 4,200, 4,500, 4,700, 5,000, or 5,200 lbm as some examples. In certain embodiments, the aircraft may be configured for lower total weights (e.g., 300 lbm, 55 lbm, and/or less than 55 lbm). For example, the aircraft may be a drone configured to comply with a total weight constraint of 55 lbm, which may optimize the aircraft for package delivery.

In certain embodiments, the aircraft may be optimized for payload capabilities. In one embodiment, the payload capabilities may range from 800-1,000 lbm, 1,000-1,200 lbm, or 1,200-1,400 lbm in certain embodiments, and yet further embodiments may be about 850 lbm, 900 lbm, 950 lbm, 1000 lbm, 1050 lbm, 1,100 lbm, 1,150 lbm, 1,200 lbm, or 1,250 lbm. In certain embodiments, the aircraft may be configured for lower payload capabilities (e.g., 0-10 lbm). For example, the aircraft may be a drone configured to carry a payload (e.g., a package, as described herein) weighing between 0-10 lbm to optimize the aircraft for package delivery. Also or alternatively, an aircraft with a total weight of 300 lbm may be configured to carry a payload weighing about 30 lbm. To optimize for weight and/or payload capabilities, a volume of the fuselage may be adjusted. For example, the fuselage may be adjusted to a volume optimized for package delivery (e.g., 4-5 cubic feet (cu. ft.), 3.65 cu. ft.)

In certain embodiments, the aircraft may be optimized to reduce noise generated by operation of the aircraft. In one example, the aircraft may implement a number of ducted fans or integrated arrays of ducted fans as described herein such that the aircraft is inaudible to a human at around 800-1,000 feet, 1,200-1,400 feet, 2,500-2,600 feet, and/or other ranges depending on the configuration of the ducted fans. In certain embodiments, the aircraft may be characterized by dominant tones at about 35-50 A-weighted decibels (dB (A)) at 100 feet, 35-40 dB (A) at 100 feet, 40-45 dB (A) at 100 feet, or 40-50 dB (A) at 100 feet. In certain embodiments, the aircraft may be configured to remain at or below 40 dB (A) to avoid acoustic detection in certain environments (e.g., a suburban environment). In some examples, the aircraft may be configured to remain at or below a threshold value (e.g., 40 dB (A)) in a particular mode (e.g., a hover mode) and/or at a particular vertical distance (e.g., 60 feet). An aircraft implementing the features described herein may achieve noise reduction such that, in certain population densities (e.g., between 140 to 1500 people) the aircraft produces noise detectable by 10 or less people while operating at about 60 feet. Aircraft as described herein thus improve over open rotor designs that may be detectable by between 140-1500 people at about 60 feet. In some examples, the aircraft may be configured such that the ducted fans result in a 25-30 dB (A) reduction in overall sound pressure level relative to known aircraft. Optimizing the aircraft to reduce noise using the features described herein provides a number of benefits over conventional aircraft. For example, a drone aircraft implementing ducted fans as described herein provides an increased number of delivery operations enabled through the reduction in noise (e.g., acoustic levels). For example, the reduced noise may allow the drone aircraft to comply with federal regulations, state regulations, and/or municipal regulations, to operate in urban or suburban environments.

It should be understood that aircraft as described herein may be optimized for a plurality of the parameters described above, and/or different parameters, without departing from the scope of this disclosure. For example, an aircraft as described herein may be optimized for a roundtrip flight range between 30-110 miles, carrying a payload weight between 0-10 lbm, and achieving a flight speed between 60-100 mph. In another example, an aircraft as described herein may be optimized for a roundtrip flight time between 0.3-1.6 hours, carrying a payload weight of 0-101 lbm, and achieving a flight speed between 60-100 mph.

Figure 17:
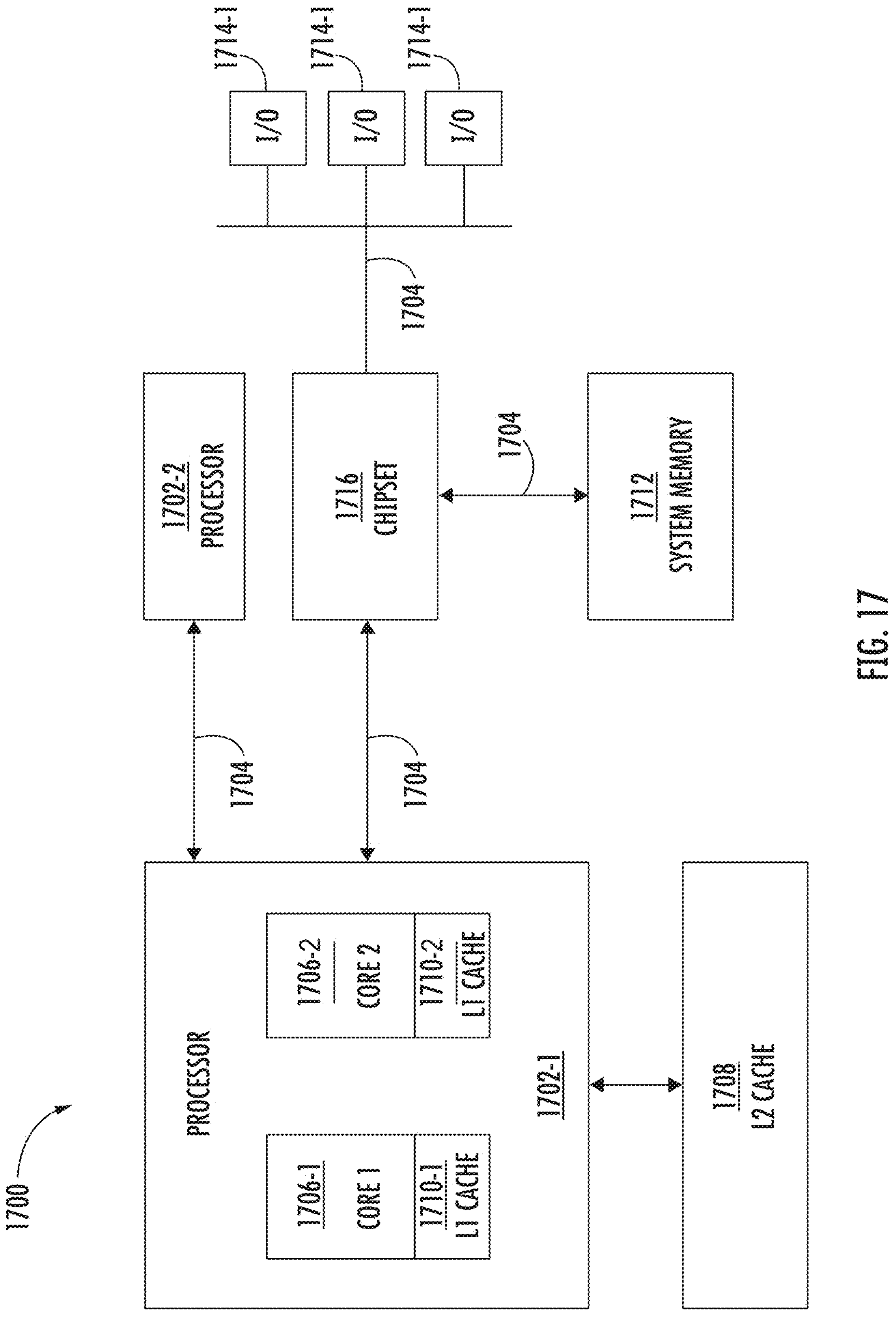
FIG. 17 illustrates an example flight control computer that may be part of or in communication with the aircraft and related systems of FIGS. 1A-16.

Aspects of this disclosure further relate to one or more non-transitory computer-readable mediums that comprise computer-readable instructions that when executed by a processor, cause the processor to perform at least one or more functions as outlined herein, such as, but not limited to, actuating aircraft control surfaces facilitating thrust vector control of aircraft, and/or other functions. FIG. 17 depicts one non-limiting example of a computer-readable medium according to certain embodiments. Specifically, FIG. 17 illustrates a block diagram of flight control computer 1700. Those skilled in the art will appreciate that the disclosure of FIG. 17 may be applicable to any system, aircraft, aircraft control system, propulsion system, exhaust area control system, flow turning control system disclosed herein and/or combinations thereof. Flight control computer 1700 may include one or more processors, such as processor 1702-1 and 1702-2 (generally referred to herein as "processors 1702" or "processor 1702"). Processors 1702 may communicate with each other or other components via an interconnection network or bus 1704. Processor 1702 may include one or more processing cores, such as cores 1706-1 and 1706-2 (referred to herein as "cores 1706" or more generally as "core 1706"), which may be implemented on a single integrated circuit (IC) chip. Although computer 1700 is shown on a single drawing, those of ordinary skill in the art with the benefit of this disclosure will appreciate that one or more components may be "remote" with respect to another component. For example, in one embodiment, one or more components may be in a separate housing from one or more other components. In some embodiments, one or more components of computer 1700 may only be in wireless communication with other components of computer 1700. In certain embodiments, one or more components of computer 1700 may be located on or within a portion of an aircraft, and yet other components may be located remote with respect to the aircraft.

In certain embodiments, moving a control surface (e.g., a flap) of an aircraft, including any control surface disclosed herein to a position and/or orientation may be based, at least in part, on one or more calculations, determinations, inputs, and or outputs of computer 1700. As non-limiting examples, position and/or orientation of one or more control surfaces may be based on operational parameters such as the final angle and/or the final extended/retracted position that one or more flaps are moved to (e.g., articulated to) during a particular instance of implementing a position and/or orientation, whether one or more control surfaces are articulated at a variable rate, the variable or constant rate implemented, a desired speed or acceleration along one or more directions (inclusive of a reduction of acceleration or velocity), weather parameters, including but not limited to wind direction or speed, weight or weight distribution of the craft or portion of the craft, amongst others.

Although examples are described above, features of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. An aircraft comprising:

a fuselage;

a wing connected to the fuselage;

a lower flap configured to transition between a first position and a second position;

an array of propulsors integrated in the wing, wherein the array of propulsors comprises:

an upper element located over fans of the propulsors;

a lower element located below the fans of the propulsors, wherein the lower element comprises the lower flap; and an exhaust area comprising an exhaust outlet located forward of a leading edge of the lower flap, wherein the array of propulsors is configured to propel an airflow across an upper surface of the lower element between the exhaust outlet and the leading edge of the lower flap;

a control assembly configured to cause, via movement of the lower flap from the first position to the second position:

modification of the exhaust area of the array of propulsors; and modification of a direction of the airflow propelled across the upper surface of the lower element between the exhaust outlet and the leading edge of the lower flap; and a plurality of horizontal tails.

2. The aircraft of claim 1, wherein the control assembly comprises:

a bar configured to cause the movement of the lower flap from the first position to the second position by articulating the lower flap relative to at least one pivot point;

at least one actuator configured to drive the bar; and a linkage assembly connecting the bar to the at least one actuator.

3. The aircraft of claim 1, wherein the control assembly is configured to move the lower flap from the first position to the second position by retracting the lower flap.

4. The aircraft of claim 1, wherein the control assembly is configured to move the lower flap from the first position to the second position by extending the lower flap.

5. The aircraft of claim 1, further comprising:

a payload attached to the fuselage;

at least one inflatable fairing attached to the payload; and at least one fan configured to selectively inflate and deflate the at least one inflatable fairing.

6. The aircraft of claim 1, wherein each fan comprises a bladed disk having a diameter of less than 3 inches.

7. The aircraft of claim 1, further comprising a camera positioned on a bottom side of the fuselage.

8. The aircraft of claim 1, further comprising at least one camera positioned at an end of the array of propulsors.

9. The aircraft of claim 1, further comprising a plurality of support struts configured to maintain the fuselage at a pitched angle relative to a landing surface.

10. The aircraft of claim 1, wherein the modification of the exhaust area comprises a decrease in a dimension of the exhaust area and wherein the modification of the direction of the airflow comprises a decrease in a turning of the airflow around the lower flap.

11. The aircraft of claim 1, wherein the modification of the exhaust area comprises an increase in a dimension of the exhaust area and wherein the modification of the direction of the airflow comprises an increase in a turning of the airflow around the lower flap.

12. The aircraft of claim 1, wherein the control assembly is configured to cause, via the movement of the lower flap from the first position to the second position, the aircraft to transition between a hover flight mode and a forward flight mode.

13. The aircraft of claim 1, wherein the control assembly is configured to cause, via the movement of the lower flap from the first position to the second position, a lift-to-drag ratio of the aircraft to meet or exceed 12.2 in a cruise mode.

14. The aircraft of claim 1, wherein the modification of the direction of the airflow propelled across the upper surface of the lower element between the exhaust outlet and the leading edge of the lower flap comprises turning the direction of the airflow at least 75 degrees over the lower flap.

15. The aircraft of claim 1, wherein the array of propulsors further comprises an upper flap positioned at a trailing edge of the upper element, the upper flap comprising:

a leading edge forward of the leading edge of the lower flap; and a trailing edge forward of a trailing edge of the lower flap.

16. The aircraft of claim 1, further comprising:

at least one propulsor connected to a horizontal tail of the plurality of horizontal tails, wherein the at least one propulsor connected to the horizontal tail comprises an articulatable lower flap.

17. The aircraft of claim 16, wherein the at least one propulsor connected to the horizontal tail further comprises a vertical vane.

18. An air-moving device for an aircraft, the air-moving device comprising:

an array of propulsors, wherein the array of propulsors comprises:

an upper element located over fans of the propulsors;

a lower element located below the fans of the propulsors, wherein the lower element comprises:

a forward edge; and a movable flap opposite the forward edge and aftward of the fans of the propulsors, the movable flap configured to direct, by moving between a first position and a second position, airflow propelled by the propulsors; and an exhaust area comprising an exhaust outlet located forward of a leading edge of the movable flap, wherein the array of propulsors is configured to propel the airflow across an upper surface of the lower element between the exhaust area and the leading edge of the movable flap; and a control assembly configured to:

receive a control signal; and based on the control signal and by moving the movable flap between the first position and the second position:

modify the exhaust area; and modify an angle of the airflow turned, via the Coanda effect, over a trailing edge of the movable flap.

19. The air-moving device of claim 18, wherein the control assembly comprises:

a bar configured to articulate the movable flap relative to at least one pivot point;

at least one actuator configured to drive the bar; and a linkage assembly connecting the bar to the at least one actuator.

20. The air-moving device of claim 18, wherein the control assembly is configured to move the movable flap by retracting the movable flap.

21. The air-moving device of claim 18, wherein the control assembly is configured to move the movable flap by extending the movable flap.

22. The air-moving device of claim 18, further comprising a vertical vane positioned in the airflow propelled by the array of propulsors.

23. The air-moving device of claim 18, wherein the control assembly is configured to cause the aircraft to transition between a hover flight mode and a forward flight mode at least by moving the movable flap between the first position and the second position.

24. The air-moving device of claim 18, wherein the movable flap defines an arc across an upper surface of the movable flap and a thickness of the movable flap is maximal at a peak of the arc.

25. A method for controlling an aircraft, comprising:

propelling, using an array of propulsors comprising an upper element and a lower element and integrated in a wing of an aircraft, an airflow across an upper surface of the lower element between an exhaust outlet located forward of a leading edge of a flap integrated in the lower element and the leading edge of the flap;

sending, by a computing device and to a control assembly, an instruction to transition the flap, positioned at a trailing edge of the lower element aftward of the array of propulsors, between a first position and a second position; and modifying both an exhaust area of at least one propulsor of the array of propulsors and a direction of the airflow propelled across the upper surface of the lower element between the exhaust outlet and the leading edge of the flap at least by moving, using the control assembly and based on the instruction, the flap between the first position and the second position.

26. The method of claim 25, wherein moving the flap comprises articulating the flap relative to at least one pivot point.

27. The method of claim 25, wherein moving the flap comprises retracting the flap.

28. The method of claim 25, wherein moving the flap comprises extending the flap.

29. The method of claim 25, wherein moving the flap causes the aircraft to transition between a hover flight mode and a forward flight mode.

30. The method of claim 25, wherein moving the flap modifies one or more of:

a flight direction of the aircraft, or a flight speed of the aircraft.

31. The method of claim 25, wherein the flap defines an arc across an upper surface of the flap and a thickness of the flap is maximal at a peak of the arc.

* * * * *